(12) United States Patent
Shafin et al.

(10) Patent No.: US 12,727,028 B2
(45) Date of Patent: Sep. 1, 2026

(54) METHOD AND APPARATUS FOR EMERGENCY PREPAREDNESS COMMUNICATION SERVICES (EPCS) PROCEDURES

(71) Applicant: Samsung Electronics Co., Ltd., Suwon-si (KR)

(72) Inventors: Rubayet Shafin, Allen, TX (US); Boon Loong Ng, Plano, TX (US); Peshal Nayak, Plano, TX (US); Vishnu Vardhan Ratnam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 18/365,824

(22) Filed: Aug. 4, 2023

(65) Prior Publication Data

US 2024/0073951 A1 Feb. 29, 2024

Related U.S. Application Data

(60) Provisional application No. 63/402,373, filed on Aug. 30, 2022.

(51) Int. Cl.

*H04W 74/0816* (2024.01)
*H04W 76/15* (2018.01)
*H04W 76/50* (2018.01)
*H04W 84/12* (2009.01)

(52) U.S. Cl.

CPC ....... *H04W 74/0816* (2013.01); *H04W 76/15* (2018.02); *H04W 76/50* (2018.02); *H04W 84/12* (2013.01)

(58) Field of Classification Search

CPC . H04W 74/0816; H04W 76/15; H04W 76/50; H04W 84/12; H04W 4/90; H04W 74/006
USPC ........................................ 370/310, 328, 329
See application file for complete search history.

(56) References Cited

U.S. PATENT DOCUMENTS

2021/0266891 A1* 8/2021 Chu ...................... H04L 5/1469
2022/0124858 A1 4/2022 Fang et al.
2022/0240264 A1* 7/2022 Chu ...................... H04W 12/06
2022/0361193 A1* 11/2022 Fang ...................... H04W 4/90
2023/0054755 A1* 2/2023 Patil ...................... H04W 76/15

OTHER PUBLICATIONS

Extended European Search Report for EP 23860734.5 by European Patent Office date Apr. 4, 2025.
"35. Extremely high throughput (EHT) MAC specification", IEEE P802.11be/D1.3, Nov. 2021.

(Continued)

*Primary Examiner* — Obaidul Huq

(57) ABSTRACT

A wireless communication network includes an access point (AP) multi-link device (MLD) and a non-AP MLD. The AP MLD generates an Extreme High Throughput (EHT) variant Enhanced Distributed Channel Access (EDCA) Parameters Set element including an EDCA Parameters Set element and a Link Indication. The EDCA Parameters Set element applies to a non-primary link between the AP MLD and the non-AP MLD. The AP MLD generates a beacon frame including the EHT variant EDCA Parameters Set element and the Link Indication subfield and transmits the beacon frame to the non-AP MLD.

9 Claims, 16 Drawing Sheets

(56) References Cited

OTHER PUBLICATIONS

Fang, Yonggang et al., "NSEP Priority Access Treatment Discussion", doc.:11-21-1862, Nov. 2021.
IEEE P802.11be-D3.2 "Part 11: Wireless LAN Medium Access Control (MAC) and Physical Layer (PHY) Specifications-Amendment 8: Enhancements for extremely high throughput (EHT)" May 2023, 1055 pgs.
IEEE Std 802.11-2020 "Part 11: Wireless LAN Medium Access Control (MAC) and Physical Layer (PHY) Specifications" IEEE Standard for Information Technology—Telecommunications and Information Exchange between Systems Local and Metropolitan Area Networks—Specific Requirements. Dec. 3, 2020. 4379 pgs.
International Search Report & Written Opinion for PCT/KR2023/012064 by Korean Intellectual Property Office dated Nov. 13, 2023.
John Wullert Subir Das et al. 'Resolution of EPCS-related CIDs in clause 4.5.13 (CC 266)', IEEE 802.11-22-1015r1, Jul. 11, 2022.
Liuming Lu et al., 'Consideration on EDCA Operation for Restricted TWT', IEEE 802.11-21/1913r6, Mar. 10, 2022.
John Wullert Subir Das et al., 'Resolution of CIDs in clauses 9.4.2.313.2 and 9.6.35 related to EPCS (LB266)', IEEE 802.11-22-1180r0, Jul. 25, 2022.
Evgeny Khorov et al. 'OBSS EDCA Parameter Sets for RTA', IEEE 802.11-20/1897r4, Apr. 26, 2021.

* cited by examiner

Figure 2A:
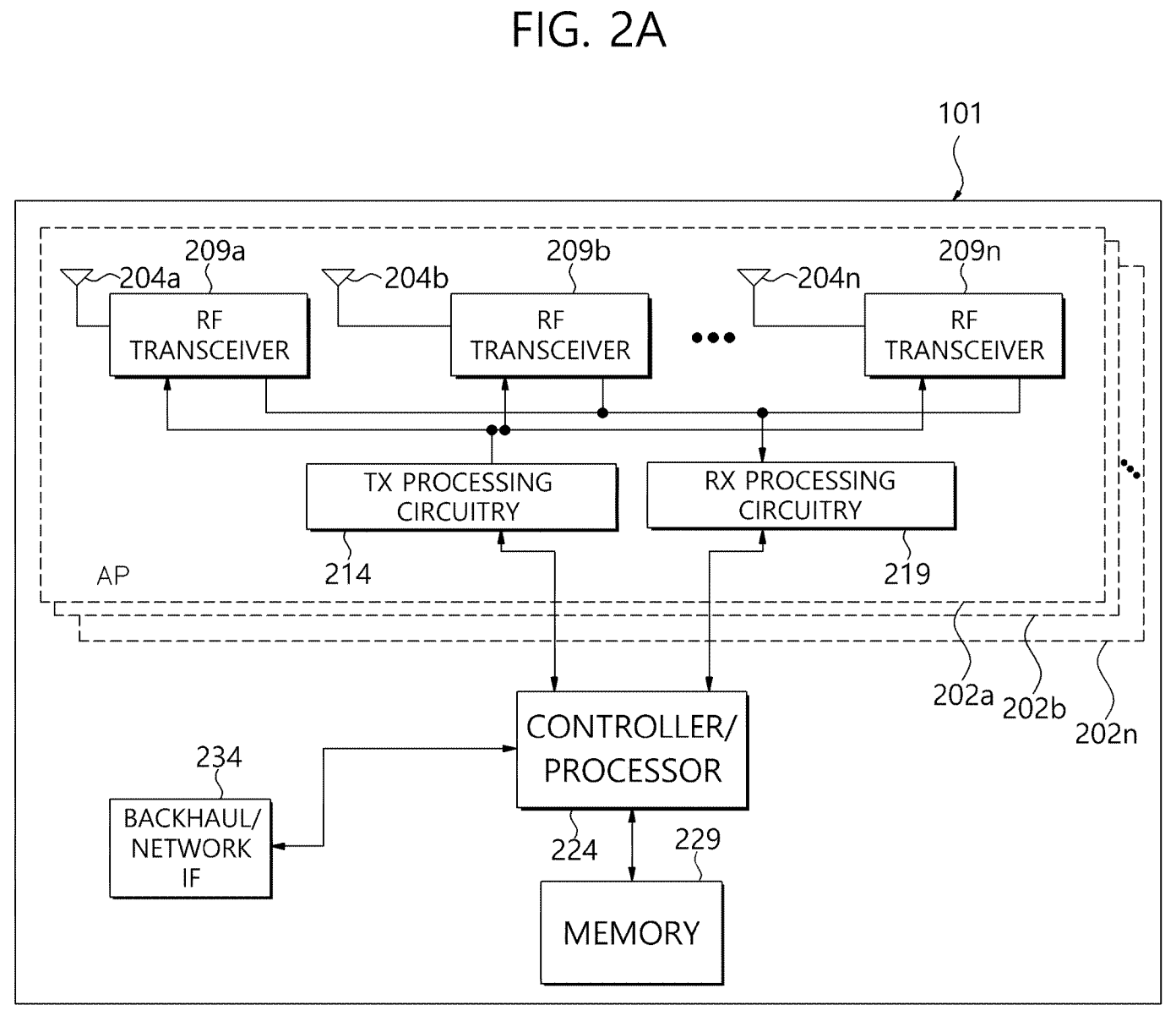

FIG. 2A 101
202a
202b
202n
AP
204a
204b
204n
209a
209b
209n
RF TRANSCEIVER
RF TRANSCEIVER
RF TRANSCEIVER
TX PROCESSING CIRCUITRY
214
RX PROCESSING CIRCUITRY
219
CONTROLLER/ PROCESSOR
224
MEMORY
229
BACKHAUL/ NETWORK IF
234

FIG. 5

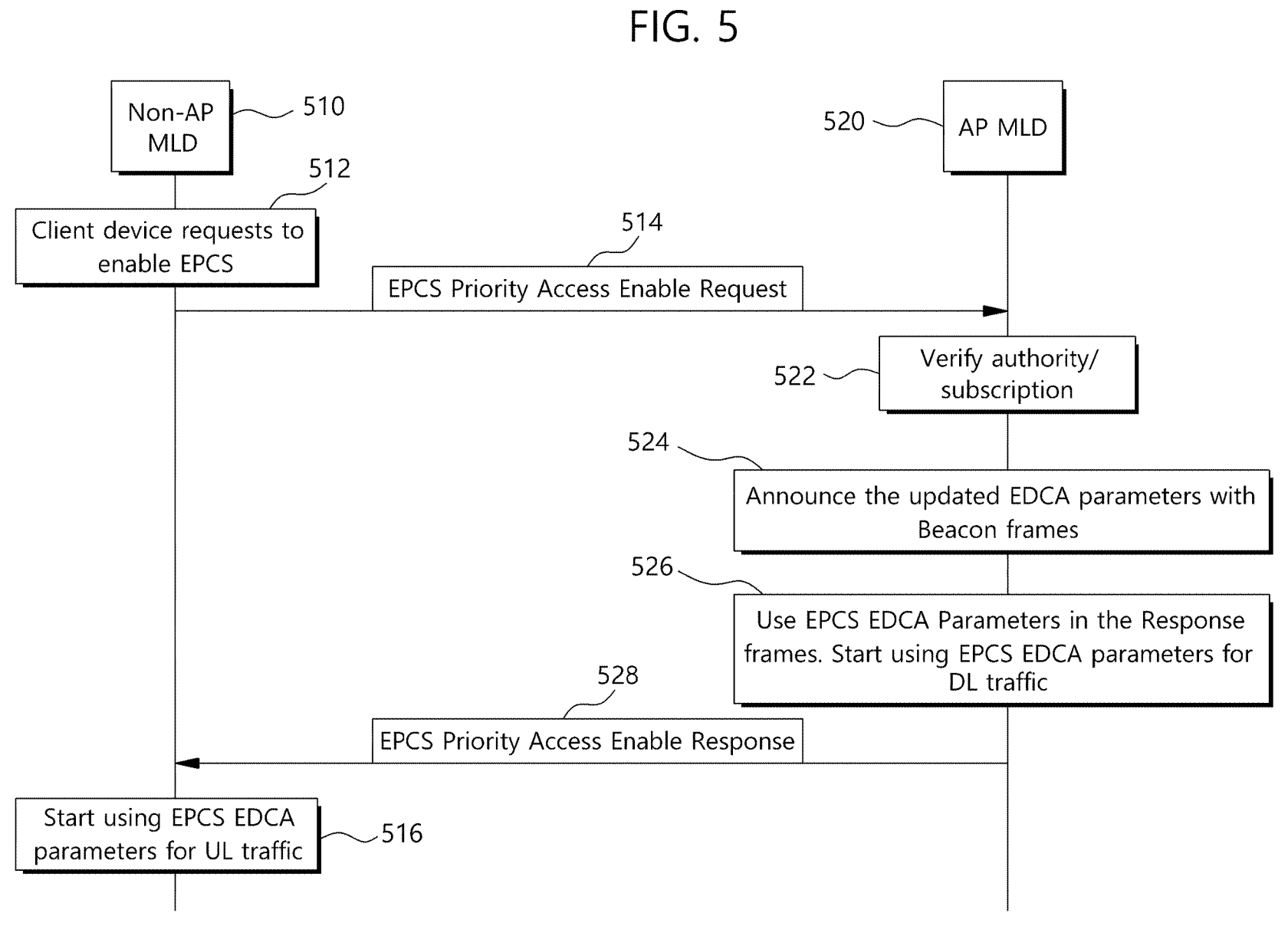

Non-AP MLD
510
AP MLD
520
Client device requests to enable EPCS
512
EPCS Priority Access Enable Request
514
Verify authority/ subscription
522
Announce the updated EDCA parameters with Beacon frames
524
Use EPCS EDCA Parameters in the Response frames. Start using EPCS EDCA parameters for DL traffic
526
EPCS Priority Access Enable Response
528
Start using EPCS EDCA parameters for UL traffic
516

650
STA1
STA2
Non-AP MLD
Link 1
Link 2
622
Beacon: EDCA Parameters Set 3—Priority Q3; Q3>Q1
620
EPCS priority Access Enablement: Link1 Priority=Q2; Link2 Priority=P2 P2>P1; Q2<Q1
612
Beacon: EDCA Parameters Set 2—Priority Q1
614
Beacon: EDCA Parameters Set 1—Priority P1
AP MLD
Non-AP MLD
AP MLD
Non-AP MLD
610
AP1
AP2
AP MLD 750
STA1
STA2
Non-AP MLD
Link 1
Non-primary Link
Link 2
Can't be transmitted on smitted on the non-primary link
715
Beacon: EDCA Parameters Set 2—Priority Q1
720
Beacon: EDCA Parameters Set 1—Priority P1
712
EPCS priority Access Torn-down: last EPCS client has disabled EPCS
AP MLD
Non-AP MLD
AP MLD
Non-AP MLD
710
AP1
AP2
NSTR Mobile AP MLD 1050
STA1
STA2
Non-AP MLD
Link 1
Non-primary
Link 2
1014
Beacon: EHT Variant EDCA Parameteters Set 1 — Priority P1 (targeted for Link 1)
1012
EPCS priority Access Torn-down: last EPCS client has disabled EPCS
1010
AP1
AP2
AP MLD
Non-AP MLD
AP MLD
Non-AP MLD
NSTR Mobile AP MLD

FIG. 11

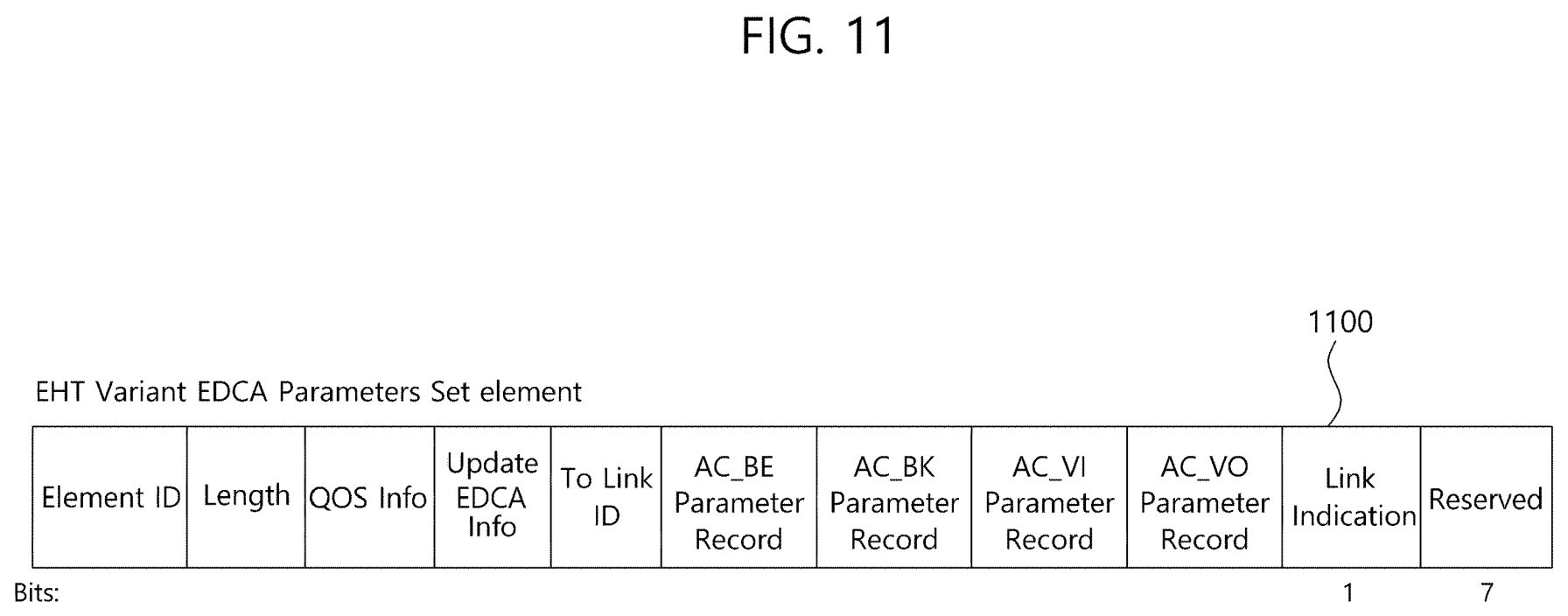

EHT Variant EDCA Parameters Set element

1100

| | Element ID | Length | QOS Info | Update EDCA Info | To Link ID | AC_BE Parameter Record | AC_BK Parameter Record | AC_VI Parameter Record | AC_VO Parameter Record | Link Indication | Reserved |
|---|---|---|---|---|---|---|---|---|---|---|---|
| Bits: | | | | | | | | | | 1 | 7 |

Figure 13B:
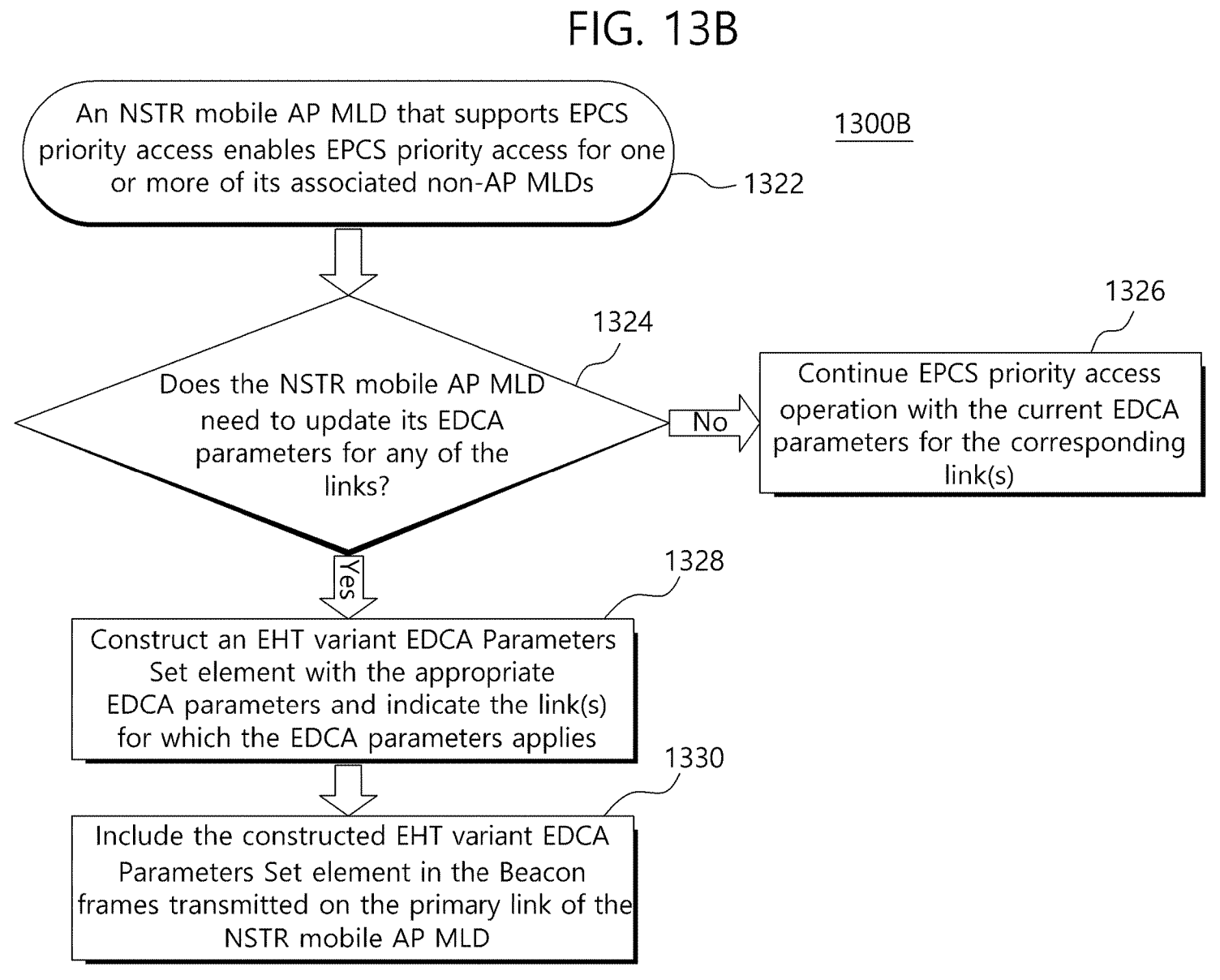

1322 An NSTR mobile AP MLD that supports EPCS priority access enables EPCS priority access for one or more of its associated non-AP MLDs 1324 Does the NSTR mobile AP MLD need to update its EDCA parameters for any of the links?

No

1326 Continue EPCS priority access operation with the current EDCA parameters for the corresponding link(s)

Yes

1328 Construct an EHT variant EDCA Parameters Set element with the appropriate EDCA parameters and indicate the link(s) for which the EDCA parameters applies 1330 Include the constructed EHT variant EDCA Parameters Set element in the Beacon frames transmitted on the primary link of the NSTR mobile AP MLD

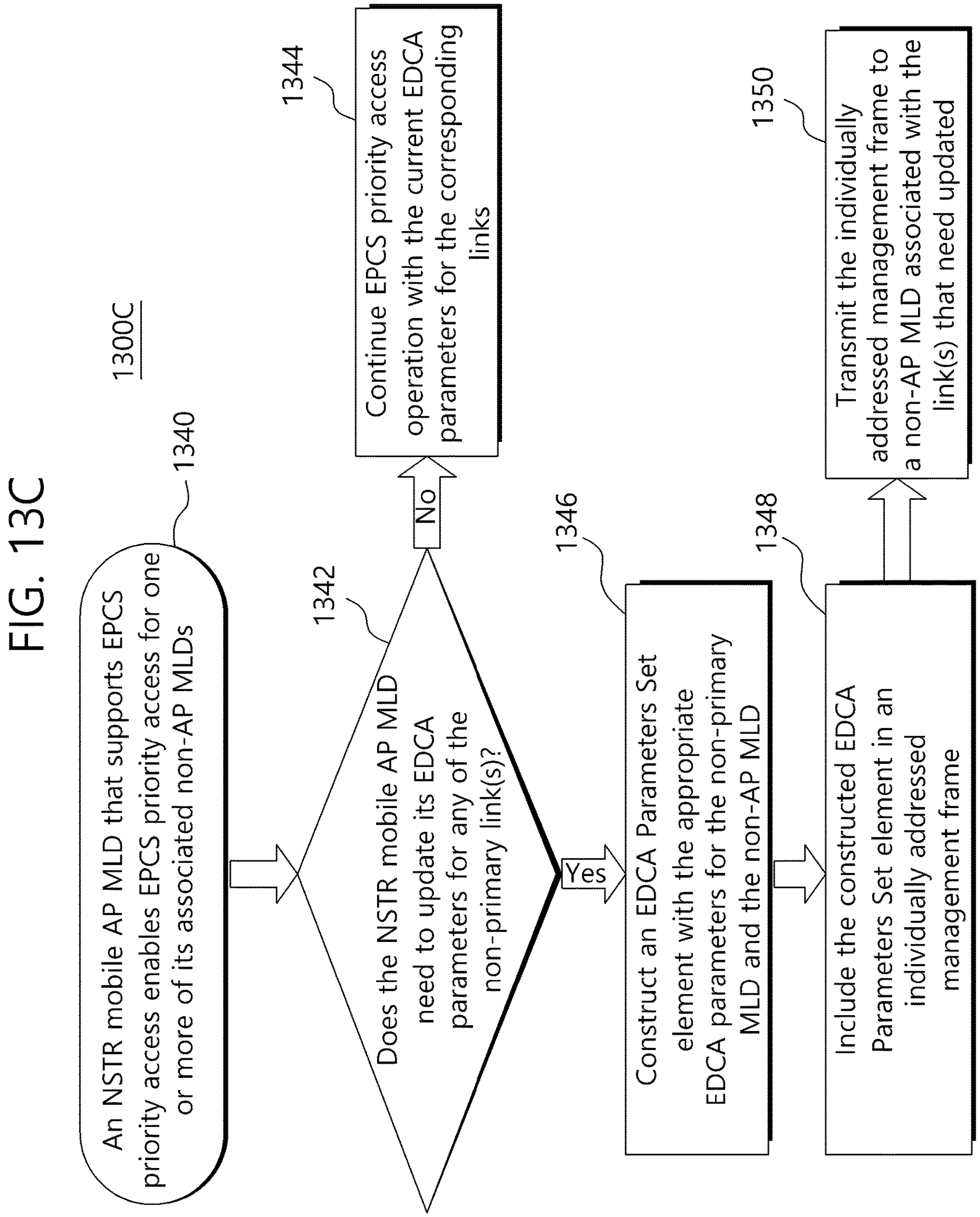
FIG. 13C
1300C
An NSTR mobile AP MLD that supports EPCS priority access enables EPCS priority access for one or more of its associated non-AP MLDs
1340
Does the NSTR mobile AP MLD need to update its EDCA parameters for any of the non-primary link(s)?
1342
No
Continue EPCS priority access operation with the current EDCA parameters for the corresponding links
1344
Yes
Construct an EDCA Parameters Set element with the appropriate EDCA parameters for the non-primary MLD and the non-AP MLD
1346
Include the constructed EDCA Parameters Set element in an individually addressed management frame
1348
Transmit the individually addressed management frame to a non-AP MLD associated with the link(s) that need updated
1350

METHOD AND APPARATUS FOR EMERGENCY PREPAREDNESS COMMUNICATION SERVICES (EPCS) PROCEDURES

CROSS-REFERENCE TO RELATED APPLICATIONS

This application claims the benefit of priority from U.S. Provisional Application No. 63/402,373, entitled "METHOD AND APPARATUS FOR EPCS PROCEDURES FOR MOBILE AP MLD", filed Aug. 30, 2022, which is incorporated herein by reference in its entirety.

TECHNICAL FIELD

This disclosure relates generally to wireless communication, and more particularly to, for example, but not limited to, multi-link traffic indication for Emergency Preparedness Communication Services (EPCS) procedures in a wireless communication system.

BACKGROUND

Wireless local area network (WLAN) technology has evolved toward increasing data rates and continues its growth in various markets such as home, enterprise and hotspots over the years since the late 1990s. WLAN allows devices to access the internet in the 2.4 GHz, 5 GHz, 6 GHz or 60 GHz frequency bands. WLANs are based on the Institute of Electrical and Electronic Engineers (IEEE) 802.11 standards. IEEE 802.11 family of standards aims to increase speed and reliability and to extend the operating range of wireless networks.

WLAN devices are increasingly required to support a variety of delay-sensitive applications or real-time applications such as augmented reality (AR), robotics, artificial intelligence (AI), cloud computing, and unmanned vehicles. To implement extremely low latency and extremely high throughput required by such applications, multi-link operation (MLO) has been suggested for the WLAN. The WLAN is formed within a limited area such as a home, school, apartment, or office building by WLAN devices. Each WLAN device may have one or more stations (STAs) such as the access point (AP) STA and the non-access-point (non-AP) STA.

The MLO may enable a non-AP multi-link device (MLD) to set up multiple links with an AP MLD. Each of multiple links may enable channel access and frame exchanges between the non-AP MLD and the AP MLD independently, which may reduce latency and increase throughput.

In recent times there has been a growing need for emergency telecommunication services over WLAN networks. Emergency preparedness communication services (EPCS) has been introduced with the goal of providing prioritized access to certain authorized users.

The description set forth in the background section should not be assumed to be prior art merely because it is set forth in the background section. The background section may describe aspects or embodiments of the present disclosure.

SUMMARY

One embodiment of the present disclosure may provide an access point (AP) multi-link device (MLD) associated with a non-AP MLD in a wireless network. the AP MLD may comprise at least two APs affiliated with the AP MLD and a processor coupled to the at least two APs. The processor may be configured to: operate with the non-AP MLD in a pair of non-simultaneous transmit and receive (NSTR) links including a primary link and a non-primary link, wherein the primary link may be established between a first AP affiliated with the AP MLD and a first station (STA) affiliated with the non-AP MLD and the non-primary link may be established between a second AP affiliated with the AP MLD and a second STA affiliated with the non-AP MLD; enable emergency preparedness communication services (EPCS) priority access between the AP MLD and the non-AP MLD; update an enhanced distributed channel access (EDCA) parameter set for the non-primary link that provides prioritized access to EPCS traffic on the non-primary link; and transmit the updated EDCA parameter set for the non-primary link to the non-AP MLD.

In some embodiments, the updated EDCA parameter set for the non-primary link may be included in an individually addressed frame transmitted via the non-primary link to the second STA affiliated with the non-AP MLD.

In some embodiments, the processor may be further configured to: update an EDCA parameter set for the primary link that provides prioritized access to EPCS traffic on the primary link; and transmit the updated EDCA parameter set for the primary link via the primary link to the first STA affiliated with the non-AP MLD, wherein the updated EDCA parameter set for the non-primary link may be the same as the updated EDCA parameter set for the primary link.

In some embodiments, the updated EDCA parameter set for the non-primary link may be included in a beacon frame transmitted via the primary link to the first STA affiliated with the non-AP MLD.

In some embodiments, the processor may be further configured to: update an EDCA parameter set for the primary link that provides prioritized access to EPCS traffic on the primary link; and transmit the updated EDCA parameter set for the primary link in a beacon frame via the primary link to the first STA affiliated with the non-AP MLD.

In some embodiments, the updated EDCA parameter set may include information indicating whether the updated EDCA parameter set is for the primary link or the non-primary link.

One embodiment of the present disclosure may provide a non-access point (non-AP) multi-link device (MLD) associated with an AP MLD in a wireless network. The non-AP MLD may comprise at least two stations (STAs) affiliated with the non-AP MLD and a processor coupled to the at least two STAs. The processor may be configured to: operate with an AP MLD in a pair of non-simultaneous transmit and receive (NSTR) links including a primary link and a non-primary link, wherein the primary link is established between a first AP affiliated with the AP MLD and a first STA affiliated with the non-AP MLD and the non-primary link is established between a second AP affiliated with the AP MLD and a second STA affiliated with the non-AP MLD; request emergency preparedness communication services (EPCS) priority access between the non-AP MLD and the AP MLD; and receive an updated EDCA parameter set for the non-primary link from the AP MLD.

In some embodiments, the updated EDCA parameter set for the non-primary link may be included in an individually addressed frame received via the non-primary link at the second STA affiliated with the non-AP MLD.

In some embodiments, the processor may be further configured to: receive an updated EDCA parameter set for the primary link via the primary link at the first STA affiliated with the non-AP MLD that provides prioritized access to EPCS traffic on the primary link, wherein the updated EDCA parameter set for the primary link is the same as the updated EDCA parameter set for the non-primary link.

In some embodiments, the updated EDCA parameter set for the non-primary link may be included in a beacon frame received via the primary link at the first STA affiliated with the non-AP MLD.

In some embodiments, the processor may be further configured to: receive an EDCA parameter set for the primary link that provides prioritized access to EPCS traffic on the primary link at the first STA affiliated with the non-AP MLD that provides prioritized access to EPCS traffic on the primary link.

In some embodiments, the updated EDCA parameter set includes information indicating whether the updated EDCA parameter set is for the primary link or the non-primary link.

One embodiment of the present disclosure may provide a method of enabling emergency preparedness communication services (EPCS) priority access by an access point (AP) multi-link device (MLD) associated with a non-AP MLD in a wireless network. The method may comprise: operating with the non-AP MLD in a pair of non-simultaneous transmit and receive (NSTR) links including a primary link and a non-primary link, wherein the primary link is established between a first AP affiliated with the AP MLD and a first station (STA) affiliated with the non-AP MLD and the non-primary link is established between a second AP affiliated with the AP MLD and a second STA affiliated with the non-AP MLD; enabling emergency preparedness communication services (EPCS) priority access between the AP MLD and the non-AP MLD; updating an enhanced distributed channel access (EDCA) parameter set for the non-primary link that provides prioritized access to EPCS traffic on the non-primary link, and transmitting the updated EDCA parameter set for the non-primary link to the non-AP MLD.

In some embodiments, the updated EDCA parameter set for the non-primary link may be included in an individually addressed frame transmitted via the non-primary link to the second STA affiliated with the non-AP MLD.

In some embodiments, the method may further comprise: updating an EDCA parameter set for the primary link that provides prioritized access to EPCS traffic on the primary link, and transmitting the updated EDCA parameter set for the primary link via the primary link to the first STA affiliated with the non-AP MLD, wherein the updated EDCA parameter set for the non-primary link is same as the updated EDCA parameter set for the primary link.

In some embodiments, the updated EDCA parameter set for the non-primary link may be included in a beacon frame transmitted via the primary link to the first STA affiliated with the non-AP MLD.

In some embodiments, the method may further comprise updating an EDCA parameter set for the primary link that provides prioritized access to EPCS traffic on the primary link; and transmitting the updated EDCA parameter set for the primary link in a beacon frame via the primary link to the first STA affiliated with the non-AP MLD.

In some embodiments, the updated EDCA parameter set may include information indicating whether the updated EDCA parameter set is for the primary link or the non-primary link.

BRIEF DESCRIPTION OF THE DRAWINGS

FIG. 2A shows an example of an AP in accordance with an embodiment.

FIG. 5 shows an example of wireless communication with an example EPCS enabling process in accordance with an embodiment.

FIG. 11 shows an example of a format of the EHT variant EDCA Parameters Set element in accordance with an embodiment.

FIG. 13A shows an example of wireless communication process in accordance with an embodiment.

FIG. 13B shows an example of a wireless communication process for using the EHT variant EDCA Parameters Set element in accordance with an embodiment.

FIG. 13C shows another example of a wireless communication process in accordance with an embodiment.

Figure 1:
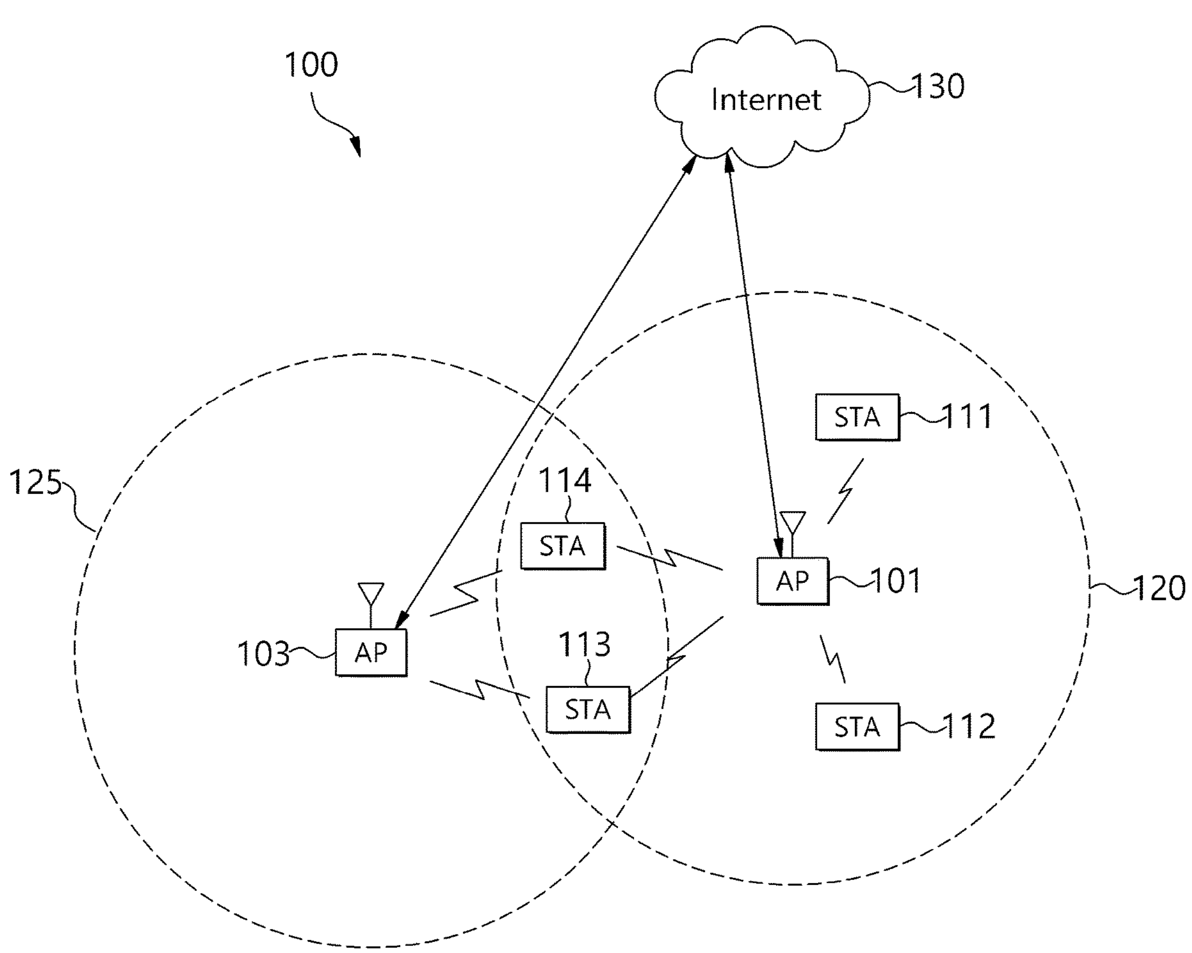
FIG. 1 shows an example of a wireless network in accordance with an embodiment.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

The present disclosure relates to a wireless communication system, for example, to a Wireless Local Area Network (WLAN) technology. WLAN allows devices to access the internet in the 2.4 GHz, 5 GHz, 6 GHz or 60 GHz frequency bands. WLANs are based on the Institute of Electrical and Electronic Engineers (IEEE) 802.11 standards. IEEE 802.11 family of standards aim to increase speed and reliability and to extend the operating range of wireless networks.

The demand of wireless data traffic is rapidly increasing due to the growing popularity among consumers and businesses of smart phones and other mobile data devices, such as tablets, "note pad" computers, net books, eBook readers, and machine type of devices. In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique. MIMO has been adopted in several wireless communications standards such 802.11ac, 802.11ax etc.

The following description is directed to certain implementations for the purpose of describing the innovative aspects of this disclosure. However, a person having ordinary skill in the art will readily recognize that the teachings herein can be applied in a multitude of different ways. The examples in this disclosure are based on WLAN communication according to the Institute of Electrical and Electronics Engineers (IEEE) 802.11 standard, including IEEE 802.11be standard and any future amendments to the IEEE 802.11 standard. However, the described embodiments may be implemented in any device, system or network that is capable of transmitting and receiving radio frequency (RF) signals according to the IEEE 802.11 standard, the Bluetooth standard, Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), 5G NR (New Radio), AMPS, or other known signals that are used to communicate within a wireless, cellular or internet of things (IoT) network, such as a system utilizing 3G, 4G, 5G, 6G, or further implementations thereof, technology.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Multi-link operation (MLO) is a key feature that is currently being developed by the standards body for next generation extremely high throughput (EHT) Wi-Fi systems in IEEE 802.11be. The Wi-Fi devices that support MLO are referred to as multi-link devices (MLD). With MLO, it is possible for a non-AP MLD to discover, authenticate, associate, and set up multiple links with an AP MLD. Channel access and frame exchange is possible on each link between the AP MLD and non-AP MLD.

FIG. 1 shows an example of a wireless network 100 in accordance with an embodiment. The embodiment of the wireless network 100 shown in FIG. 1 is for illustrative purposes only. Other embodiments of the wireless network 100 could be used without departing from the scope of this disclosure.

As shown in FIG. 1, the wireless network 100 may include a plurality of wireless communication devices. Each wireless communication device may include one or more stations (STAs). The STA may be a logical entity that is a singly addressable instance of a medium access control (MAC) layer and a physical (PHY) layer interface to the wireless medium. The STA may be classified into an access point (AP) STA and a non-access point (non-AP) STA. The AP STA may be an entity that provides access to the distribution system service via the wireless medium for associated STAs. The non-AP STA may be a STA that is not contained within an AP-STA. For the sake of simplicity of description, an AP STA may be referred to as an AP and a non-AP STA may be referred to as a STA. In the example of FIG. 1, APs 101 and 103 are wireless communication devices, each of which may include one or more AP STAs. In such embodiments, APs 101 and 103 may be AP multi-link device (MLD). Similarly, STAs 111-114 are wireless communication devices, each of which may include one or more non-AP STAs. In such embodiments, STAs 111-114 may be non-AP MLD.

The APs 101 and 103 may communicate with at least one network 130, such as the Internet, a proprietary Internet Protocol (IP) network, or other data network. The AP 101 provides wireless access to the network 130 for a plurality of stations (STAs) 111-114 with a coverage area 120 of the AP 101. The APs 101 and 103 may communicate with each other and with the STAs using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

In FIG. 1, dotted lines show the approximate extents of the coverage area 120 and 125 of APs 101 and 103, which are shown as approximately circular for the purposes of illustration and explanation. It should be clearly understood that coverage areas associated with APs, such as the coverage areas 120 and 125, may have other shapes, including irregular shapes, depending on the configuration of the APs.

As described in more detail below, one or more of the APs may include circuitry and/or programming for management of MU-MIMO and OFDMA channel sounding in WLANs. Although FIG. 1 shows one example of a wireless network 100, various changes may be made to FIG. 1. For example, the wireless network 100 may include any number of APs and any number of STAs in any suitable arrangement. Also, the AP 101 may communicate directly with any number of STAs and provide those STAs with wireless broadband access to the network 130. Similarly, each AP 101 and 103 may communicate directly with the network 130 and provides STAs with direct wireless broadband access to the network 130. Further, the APs 101 and/or 103 may provide access to other or additional external networks, such as external telephone networks or other types of data networks.

FIG. 2A shows an example of an AP 101 in accordance with an embodiment. The embodiment of the AP 101 shown in FIG. 2A is for illustrative purposes, and the AP 103 of FIG. 1 could have the same or similar configuration. However, APs come in a wide range of configurations, and FIG. 2A does not limit the scope of this disclosure to any particular implementation of an AP.

As shown in FIG. 2A, the AP 101 may include multiple antennas 204*a*-204*n*, multiple radio frequency (RF) transceivers 209*a*-209*n*, transmit (TX) processing circuitry 214, and receive (RX) processing circuitry 219. The AP 101 may also include a controller/processor 224, a memory 229, and a backhaul or network interface 234. The RF transceivers 209*a*-209*n* receive, from the antennas 204*a*-204*n*, incoming RF signals, such as signals transmitted by STAs in the network 100. The RF transceivers 209*a*-209*n* down-convert the incoming RF signals to generate intermediate (IF) or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209*a*-209*n* receive the outgoing processed baseband or IF signals from the TX processing circuitry 214 and up-converts the baseband or IF signals to RF signals that are transmitted via the antennas 204*a*-204*n*.

The controller/processor 224 may include one or more processors or other processing devices that control the overall operation of the AP 101. For example, the controller/processor 224 may control the reception of uplink signals and the transmission of downlink signals by the RF transceivers 209*a*-209*n*, the RX processing circuitry 219, and the TX processing circuitry 214 in accordance with well-known principles. The controller/processor 224 may support additional functions as well, such as more advanced wireless communication functions. For instance, the controller/processor 224 may support beam forming or directional routing operations in which outgoing signals from multiple antennas 204*a*-204*n* are weighted differently to effectively steer the outgoing signals in a desired direction. The controller/processor 224 may also support OFDMA operations in which outgoing signals are assigned to different subsets of subcarriers for different recipients (e.g., different STAs 111-114). Any of a wide variety of other functions could be supported in the AP 101 by the controller/processor 224 including a combination of DL MU-MIMO and OFDMA in the same transmit opportunity. In some embodiments, the controller/processor 224 may include at least one microprocessor or microcontroller. The controller/processor 224 may also be capable of executing programs and other processes resident in the memory 229, such as an OS. The controller/processor 224 may move data into or out of the memory 229 as required by an executing process.

The controller/processor 224 may also be coupled to the backhaul or network interface 234. The backhaul or network interface 234 may allow the AP 101 to communicate with other devices or systems over a backhaul connection or over a network. The interface 234 may support communications over any suitable wired or wireless connection(s). For example, the interface 234 may allow the AP 101 to communicate over a wired or wireless local area network or over a wired or wireless connection to a larger network (such as the Internet). The interface 234 may include any suitable structure supporting communications over a wired or wireless connection, such as an Ethernet or RF transceiver. The memory 229 may be coupled to the controller/processor 224. Part of the memory 229 may include a RAM, and another part of the memory 229 may include a Flash memory or other ROM.

As described in more detail below, the AP 101 may include circuitry and/or programming for management of channel sounding procedures in WLANs. Although FIG. 2A illustrates one example of AP 101, various changes may be made to FIG. 2A. For example, the AP 101 may include any number of each component shown in FIG. 2A. As a particular example, an AP may include a number of interfaces 234, and the controller/processor 224 may support routing functions to route data between different network addresses. As another example, while shown as including a single instance of TX processing circuitry 214 and a single instance of RX processing circuitry 219, the AP 101 may include multiple instances of each (such as one per RF transceiver). Alternatively, only one antenna and RF transceiver path may be included, such as in legacy APs. Also, various components in FIG. 2A may be combined, further subdivided, or omitted and additional components may be added according to particular needs.

As shown in FIG. 2A, in some embodiments, the AP 101 may be an AP MLD that includes multiple APs 202*a*-202*n*. Each AP 202*a*-202*n* is affiliated with the AP MLD 101 and may include multiple antennas 204*a*-204*n*, multiple radio frequency (RF) transceivers 209*a*-209*n*, transmit (TX) processing circuitry 214, and receive (RX) processing circuitry 219. Each APs 202*a*-202*n* may independently communicate with the controller/processor 224 and other components of the AP MLD 101. FIG. 2A shows that each AP 202*a*-202*n* has separate multiple antennas, but each AP 202*a*-202*n* may share multiple antennas 204*a*-204*n* without needing separate multiple antennas. Each AP 202*a*-202*n* may represent a physical (PHY) layer and a lower media access control (MAC) layer.

Figure 2B:
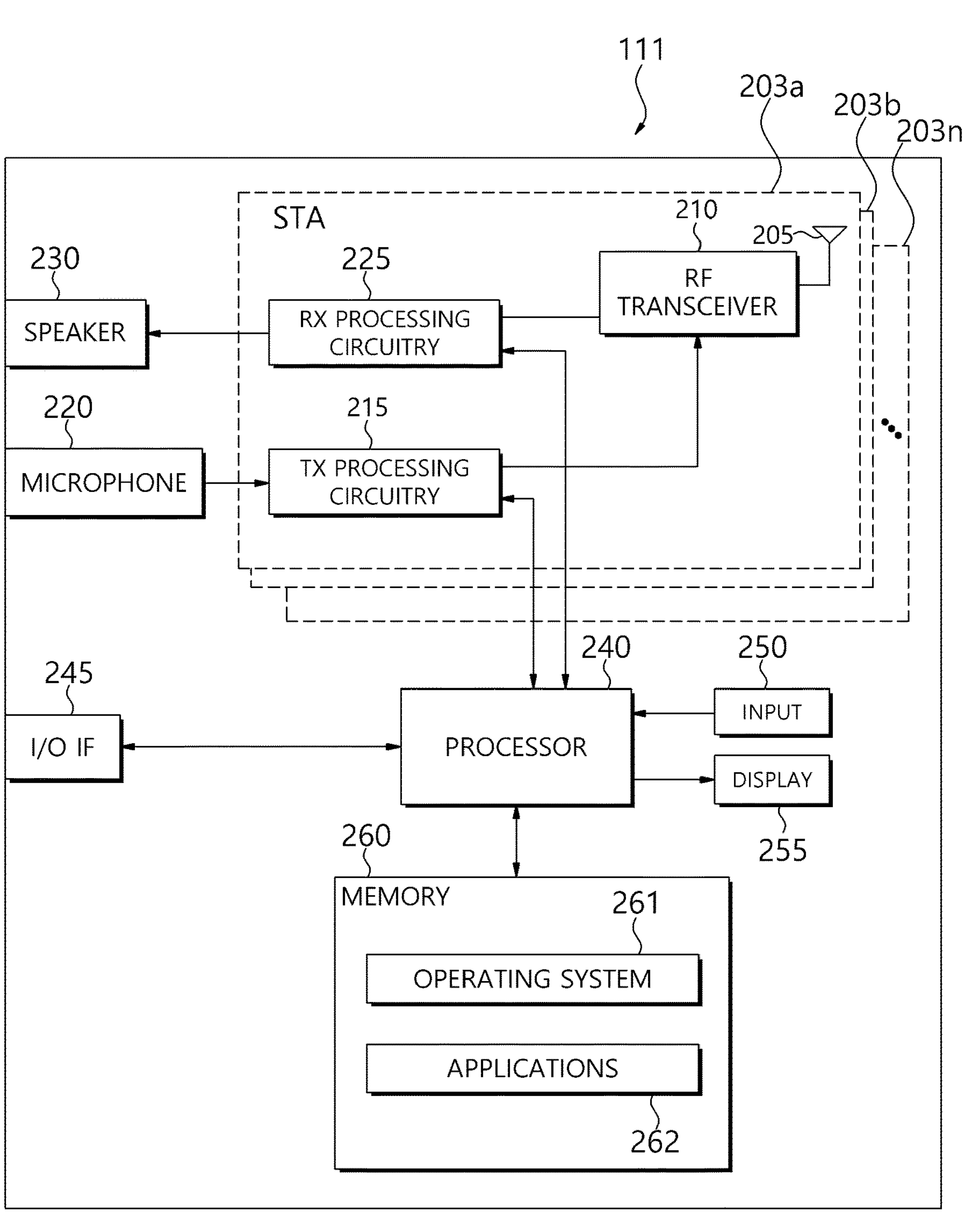
FIG. 2B shows an example of a STA in accordance with an embodiment.

FIG. 2B shows an example of a STA 111 in accordance with an embodiment. The embodiment of the STA 111 shown in FIG. 2B is for illustrative purposes, and the STAs 111-114 of FIG. 1 may have the same or similar configuration. However, STAs come in a wide variety of configurations, and FIG. 2B does not limit the scope of this disclosure to any particular implementation of a STA.

As shown in FIG. 2B, the STA 111 may include antenna(s) 205, a RF transceiver 210, TX processing circuitry 215, a microphone 220, and RX processing circuitry 225. The STA 111 may also include a speaker 230, a controller/processor 240, an input/output (I/O) interface (IF) 245, a touchscreen 250, a display 255, and a memory 260. The memory 260 may include an operating system (OS) 261 and one or more applications 262.

The RF transceiver 210 may receive, from the antenna(s) 205, an incoming RF signal transmitted by an AP of the network 100. The RF transceiver 210 may down-convert the incoming RF signal to generate an IF or baseband signal. The IF or baseband signal may be sent to the RX processing circuitry 225, which may generate a processed baseband signal by filtering, decoding, and/or digitizing the baseband or IF signal. The RX processing circuitry 225 may transmit the processed baseband signal to the speaker 230 (such as for voice data) or to the controller/processor 240 for further processing (such as for web browsing data).

The TX processing circuitry 215 may receive analog or digital voice data from the microphone 220 or other outgoing baseband data (such as web data, e-mail, or interactive video game data) from the controller/processor 240. The TX processing circuitry 215 may encode, multiplex, and/or digitize the outgoing baseband data to generate a processed baseband or IF signal. The RF transceiver 210 may receive the outgoing processed baseband or IF signal from the TX processing circuitry 215 and up-convert the baseband or IF signal to an RF signal that may be transmitted via the antenna(s) 205.

The controller/processor 240 may include one or more processors and execute the basic OS program 261 stored in the memory 260 in order to control the overall operation of the STA 111. In one such operation, the controller/processor 240 may control the reception of downlink signals and the transmission of uplink signals by the RF transceiver 210, the RX processing circuitry 225, and the TX processing circuitry 215 in accordance with well-known principles. The controller/processor 240 may also include processing circuitry configured to provide management of channel sounding procedures in WLANs. In some embodiments, the controller/processor 240 may include at least one microprocessor or microcontroller.

The controller/processor 240 may also be capable of executing other processes and programs resident in the memory 260, such as operations for management of channel sounding procedures in WLANs. The controller/processor 240 may move data into or out of the memory 260 as required by an executing process. In some embodiments, the controller/processor 240 may be configured to execute a plurality of applications 262, such as applications for channel sounding, including feedback computation based on a received null data packet announcement (NDPA) and null data packet (NDP) and transmitting the beamforming feedback report in response to a trigger frame (TF). The controller/processor 240 may operate the plurality of applications 262 based on the OS program 261 or in response to a signal received from an AP. The controller/processor 240 may also be coupled to the I/O interface 245, which provides STA 111 with the ability to connect to other devices such as laptop computers and handheld computers. The I/O interface 245 may be the communication path between these accessories and the main controller/processor 240.

The controller/processor 240 may also be coupled to the input 250 (such as touchscreen) and the display 255. The operator of the STA 111 may use the input 250 to enter data into the STA 111. The display 255 may be a liquid crystal display, light emitting diode display, or other display capable of rendering text and/or at least limited graphics, such as from web sites. The memory 260 may be coupled to the controller/processor 240. Part of the memory 260 may include a random access memory (RAM), and another part of the memory 260 may include a Flash memory or other read-only memory (ROM).

Although FIG. 2B shows one example of STA 111, various changes may be made to FIG. 2B. For example, various components in FIG. 2B may be combined, further subdivided, or omitted and additional components may be added according to particular needs. In particular examples, the STA 111 may include any number of antenna(s) 205 for MIMO communication with an AP 101. In another example, the STA 111 may not include voice communication or the controller/processor 240 may be divided into multiple processors, such as one or more central processing units (CPUs) and one or more graphics processing units (GPUs). Also, while FIG. 2B illustrates the STA 111 configured as a mobile telephone or smartphone, STAs may be configured to operate as other types of mobile or stationary devices.

As shown in FIG. 2B, in some embodiment, the STA 111 may be a non-AP MLD that includes multiple STAs 203*a*-203*n*. Each STA 203*a*-203*n* may be affiliated with the non-AP MLD 111 and may include an antenna(s) 205, a RF transceiver 210, TX processing circuitry 215, and RX processing circuitry 225. Each STAs 203*a*-203*n* may independently communicate with the controller/processor 240 and other components of the non-AP MLD 111. FIG. 2B shows that each STA 203*a*-203*n* has a separate antenna, but each STA 203*a*-203*n* may share the antenna 205 without needing separate antennas. Each STA 203*a*-203*n* may represent a physical (PHY) layer and a lower media access control (MAC) layer.

Figure 3:
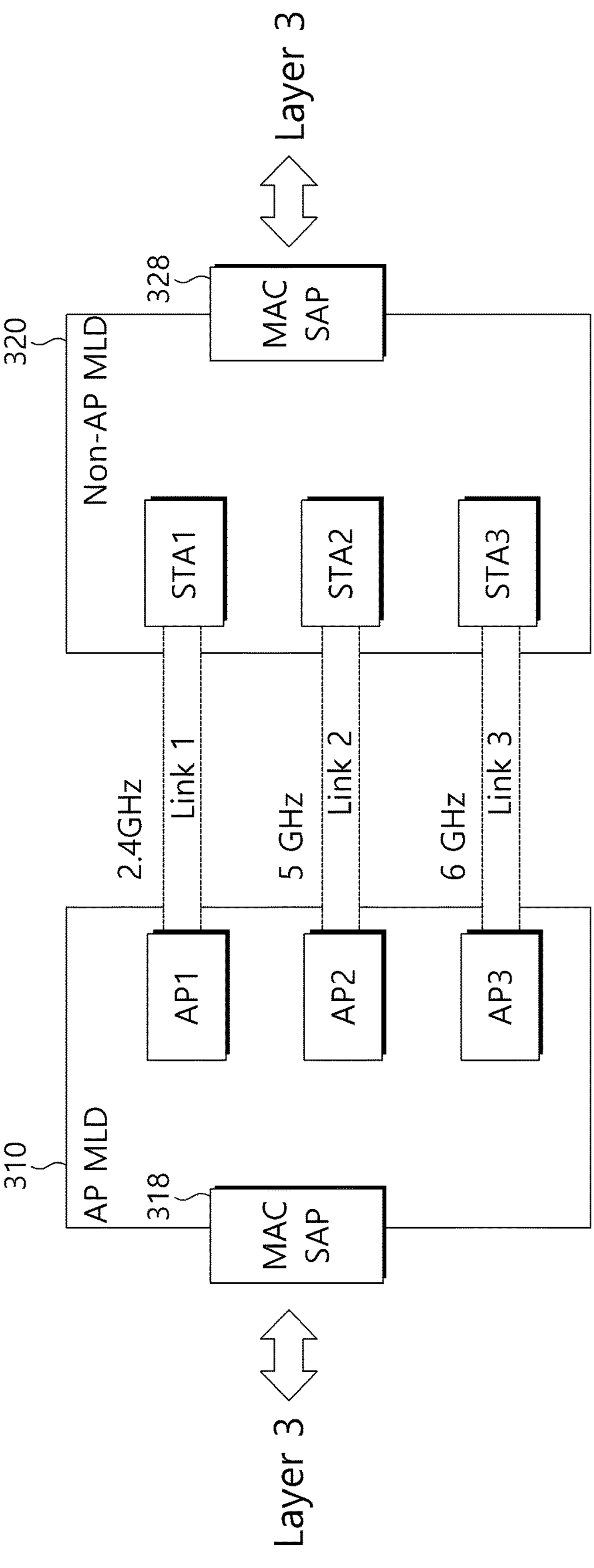
FIG. 3 shows an example of multi-link communication operation in accordance with an embodiment.

FIG. 3 shows an example of multi-link communication operation in accordance with an embodiment. The multi-link communication operation may be applicable to IEEE 802.11be standard and any future amendments to IEEE 802.11 standard. In FIG. 3, an AP MLD 310 may be the wireless communication device 101 and 103 in FIG. 1 and a non-AP MLD 220 may be one of the wireless communication devices 111-114 in FIG. 1.

As shown in FIG. 3, the AP MLD 310 may include a plurality of affiliated APs, for example, including AP 1, AP 2 and AP 3. Each affiliated AP may include a PHY interface to wireless medium (Link 1, Link 2, or Link 3). The AP MLD 310 may include a single MAC service access point (SAP) 318 through which the affiliated APs of the AP MLD 310 may communicate with a higher layer (Layer 3 or network layer). Each affiliated AP of the AP MLD 310 may have a MAC address (lower MAC address) different from any other affiliated APs of the AP MLD 310. The AP MLD 310 may have a MLD MAC address (upper MAC address) and the affiliated APs share the single MAC SAP 318 to Layer 3. Thus, the affiliated APs may share a single IP address, and the Layer 3 may recognize the AP MLD 310 by assigning the single IP address.

The non-AP MLD 320 may include a plurality of affiliated STAs, for example, including STA 1, STA 2 and STA 3. Each affiliated STA may include a PHY interface to the wireless medium (Link 1, Link 2, or Link 3). The non-AP MLD 320 may include a single MAC SAP 328 through which the affiliated STAs of the non-AP MLD 320 may communicate with a higher layer (Layer 3 or network layer). Each affiliated STA of the non-AP MLD 320 may have a MAC address (lower MAC address) different from any other affiliated STAs of the non-AP MLD 320. The non-AP MLD 320 may have a MLD MAC address (upper MAC address) and the affiliated STAs may share the single MAC SAP 328 to Layer 3. Thus, the affiliated STAs may share a single IP address, and the Layer 3 may recognize the non-AP MLD 320 by assigning the single IP address.

The AP MLD 310 and the non-AP MLD 320 may set up multiple links between their affiliate APs and STAs. In this example, the AP 1 and the STA 1 may set up Link 1 which may operate in 2.4 GHz band. Similarly, the AP 2 and the STA 2 may set up Link 2 which may operate in 5 GHz band, and the AP 3 and the STA 3 may set up Link 3 which may operate in 6 GHz band. Each link may enable channel access and frame exchange between the AP MLD 310 and the non-AP MLD 320 independently, which may increase data throughput and reduce latency.

In order to prioritize transmission of different types of traffic, which may be identified by a traffic identifier (TID), across the setup links, the non-AP MLD 320 may negotiate a TID-to-link mapping with the AP MLD 310. The TID-to-link mapping may allow the AP MLD 310 and the non-AP MLD 320 to determine how frames belonging to TIDs may be assigned for transmission on each setup link in the uplink and downlink directions, respectively. When at least one TID associated with a non-AP MLD 320 is mapped to a setup link in either uplink or downlink direction, the link may be referred to as an enabled link for the non-AP MLD 320. By default, all TIDs are mapped to all the setup links between the AP MLD 310 and the non-AP MLD 320, and this mapping may be referred to as a default TID-to-link mapping. During association, the non-AP MLD 320 may use a negotiation procedure to negotiate a non-default mapping of TIDs to the setup links, by including a TID-to-Link Mapping element in an association request frame or a reassociation request frame. The non-default mapping may be either where all TIDs are mapped to the same subset of setup links, or where not all TIDs are mapped to the same subset of setup links. The AP MLD 310 may also use a broadcast procedure to indicate switching to a non-default mapping for all associated non-AP MLDs. In default mapping mode, all TIDs may be mapped to all setup link for downlink and uplink and all setup links may be enabled. The non-AP MLD 320 may operate under default mapping mode when a TID-to-link mapping negotiation did not occur or was unsuccessful.

Figure 4:
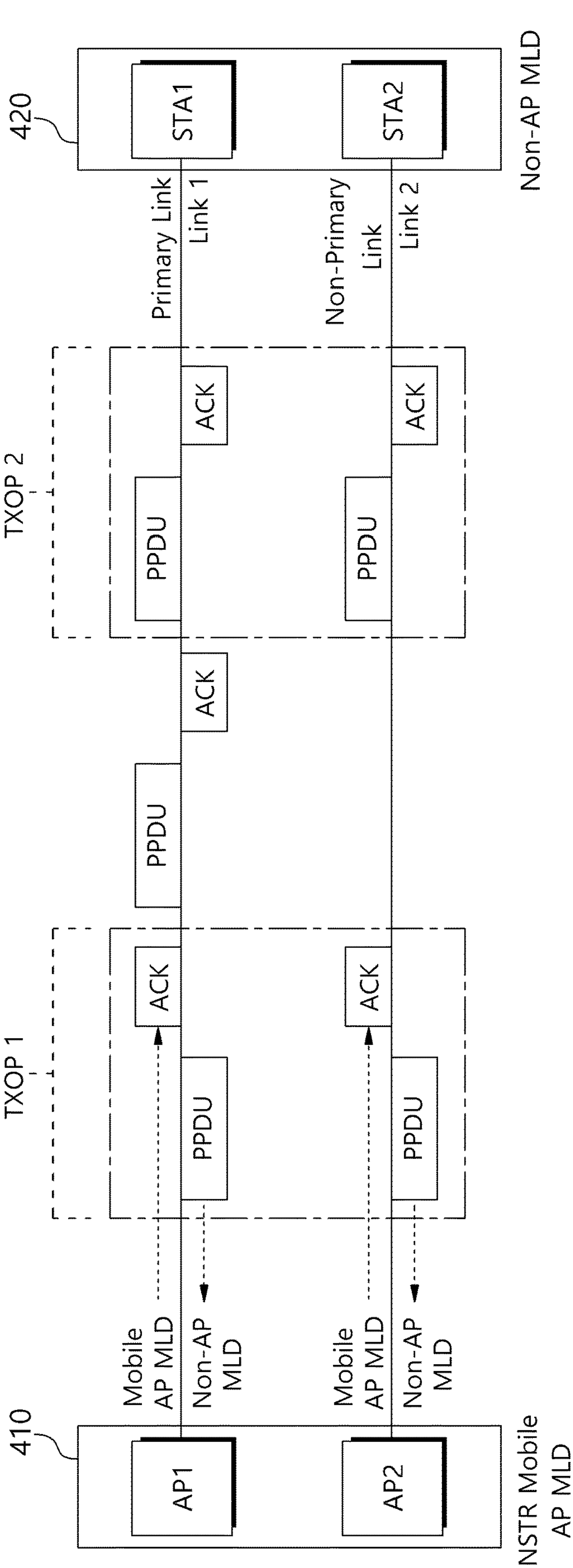
FIG. 4 shows an example of wireless communication in accordance with an embodiment.

FIG. 4 shows an example of wireless communication in accordance with an embodiment. This example may be applicable to IEEE 802.11be standard and any future amendments to IEEE 802.11 standard. The AP MLD 410 and the non-AP MLD 420 may be examples of the AP MLD 310 and the non-AP MLD 320 illustrated in FIG. 3, respectively. FIG. 4 shows an example of multi-link communication operation. The AP MLD 410 may include two affiliated APs (AP 1 and AP 2), and the non-AP MLD 420 may include two affiliated STAs (STA 1 and STA 2). AP 1 and STA 1 may operate on Link 1 (a Primary link), and AP 2 and STA 2 may operate on Link 2 (a non-primary link). The AP MLD 410 may also be an example of the wireless communication device 101 and 103 in FIG. 1 and the non-AP MLD 420 may be an example of one of the wireless communication devices 111-114 in FIG. 1, respectively. Although FIG. 4 shows an example of two APs and two STAs, there may less or more number of APs and STAs.

With MLO, the non-AP MLD 420 may discover, authenticate, associate, and set up multiple links with the AP MLD 410. Channel access and frame exchange is possible on each link between the AP MLD 410 and non-AP MLD 420. In the example of FIG. 4, the AP MLD 410 may include two affiliated APs (AP 1 and AP 2), and the non-AP MLD 420 may include two affiliated STAs (STA 1 and STA 2). Two links may be set up between the AP MLD 410 and the non-AP MLD 420. Specifically, Link 1 is set up between AP 1 and STA1, and Link 2 is set up between AP 2 and STA 2. In this example, both Link 1 and Link 2 may be enabled links.

An AP MLD is typically able to simultaneously transmit and receive over all of its links. In addition, the standard defines a special AP MLD, namely, Non-Simultaneous Transmit and Receive (NSTR) Mobile AP MLD, which may have NSTR link pairs. Two kinds of links are defined for NSTR Mobile AP MLD—primary link and non-primary link.

In a synchronous operation of NSTR Mobile AP MLD, STAs affiliated with a non-AP MLD that is associated with an NSTR Mobile AP MLD may transmit a Physical layer Protocol Data Unit (PPDU) within the time allocated by an AP affiliated with the NSTR Mobile AP MLD on the non-primary link only if the STA affiliated with the same MLD on the primary link is also transmitting a PPDU within a Transmit Opportunity (TXOP) duration as a TXOP holder or transmitting a PPDU within the time allocated by an AP affiliated with the NSTR Mobile AP MLD on the primary link at the same time. A TXOP is a bounded time interval during which a station can send as many frames as possible (as long as the duration of the transmissions does not extend beyond the maximum duration of the TXOP). In the example of FIG. 4, when transmitting PPDU over the non-primary link (e.g., Link 2), the AP affiliated NSTR Mobile AP MLD that is operating on the primary link (e.g., AP 1 on Link 1) or a non-AP STA affiliated with a non-AP MLD that is associated with the NSTR Mobile AP MLD and operating on the non-primary link (e.g., STA 2 on Link 2), needs to align the PPDU with the PPDU transmitted over the primary link (e.g., TXOP 1 and TXOP 2 on Link 1).

One aspect of the 802.11 standard is the provision for Emergency Preparedness Communication Services (EPCS) and its priority access procedure. This feature allows emergency services, such as public safety agencies, to have reliable and uninterrupted access to wireless networks, for example during critical situations or network congestion. It allows emergency-related traffic to be given precedence over other types of network traffic. The highest priority class, typically referred to as the Emergency Services (ES) class, is reserved for emergency-related communications. Other lower priority classes are used for regular data traffic. The standard defines different Access Categories (AC's) that determine the different priorities of network access. Priority access involves treating the EPCS traffic with a higher priority in obtaining channel access and in allocation of network resources. The service is only available to designated, authorized devices.

With EPCS capability enabled, a device may obtain higher priority in channel access over non-EPCS devices. For EPCS, the AP MLD assigns higher priority EDCA parameters to the devices with EPCS features enabled. The Enhanced Distributed Channel Access (EDCA) mechanism may be employed to manage the contention for channel access. EDCA may assign different contention parameters, such as contention window size and arbitration interframe space (AIFS), to each AC. For example, the ES AC is configured with the most favorable parameters, allowing it to contend for channel access more aggressively than other ACs. EDCA provides contention-free access to the channel during a TXOP.

For a non-AP MLD, EPCS feature may be enabled through negotiation with the AP MLD. APs that have EPCS priority access activated may advertise this capability in Beacon and Probe Response frames. The EPCS access may be granted on an individual basis. For example, APs authorize non-AP STAs to use EPCS priority access based on locally available information or through a service provider's authorization infrastructure. Upon approval from the AP MLD, higher priority EDCA parameters may be granted to the EPCS-enabled devices. EDCA Parameters are carried in EDCA Parameters Set element, which is typically carried in the Beacon frame. For MLD operation, each link can have its own EDCA parameters. The AP MLD broadcasts the Beacon frame on each link carrying the EDCA Parameters Set element. Beacon frames are management frames that may be transmitted periodically, for example to announce the presence of a wireless LAN and to synchronize the members of the service set.

FIG. 5 shows an example of wireless communication in accordance with an embodiment. This example may be applicable to IEEE 802.11be standard and any future amendments to IEEE 802.11 standard. The AP MLD 510 and the non-AP MLD 520 may be examples of the AP MLD 310 and the non-AP MLD 320 illustrated in FIG. 3, respectively. FIG. 5 shows an example EPCS enabling process between a non-AP MLD 510 and an AP MLD 520. The AP MLD 520 has EPCS priority access activated and has already announced this capability.

In operation 512, a client device associated with an STA at the non-AP MLD 510 may request to enable EPCS operation. The non-AP STA may invoke EPCS priority access when instructed to do so by a higher layer function, such as an authorized user at the client device. The non-AP STA affiliated with the non-AP MLD 510 may enable EPCS priority access by sending an EPCS Priority Access Enable Request frame 514 to the associated AP MLD 520.

In operation 522, upon receiving the EPCS Priority Access Enable Request, the AP MLD 520 may verify and authorize the non-AP STA, for example, using locally stored verification information or information received from an EPCS service provider.

In operation 524, the AP MLD 520 may announce in Beacon frames the updated EDCA parameters.

In operation 526, the AP MLD 520 may begin to use the EPCS EDCA parameters for downlink traffic. The AP MLD 520 may also send an EPCS Priority Access Enable Response frame 528 to the non-AP STA that includes the EPCS EDCA parameters.

In operation 516, after receiving the EPCS Priority Access Enable Response frame 528, the non-AP STA affiliated with non-AP MLD 510 may begin to use the EPCS EDCA parameters for uplink traffic.

The above is just an example of an EPCS enabling process. In another example, the AP MLD may enable EPCS priority access by sending an unsolicited EPCS Priority Access Enable Request frame to a non-AP STA and the non-AP STA may confirm the request by sending an EPCS Priority Access Enable Response frame.

The EDCA parameters are carried in EDCA Parameters Set element, which may be carried in the Beacon frame. For MLD operation, each link may have its own EDCA parameters. The AP MLD may broadcast on each link the Beacon frame carrying the EDCA Parameters Set element.

Figure 6:
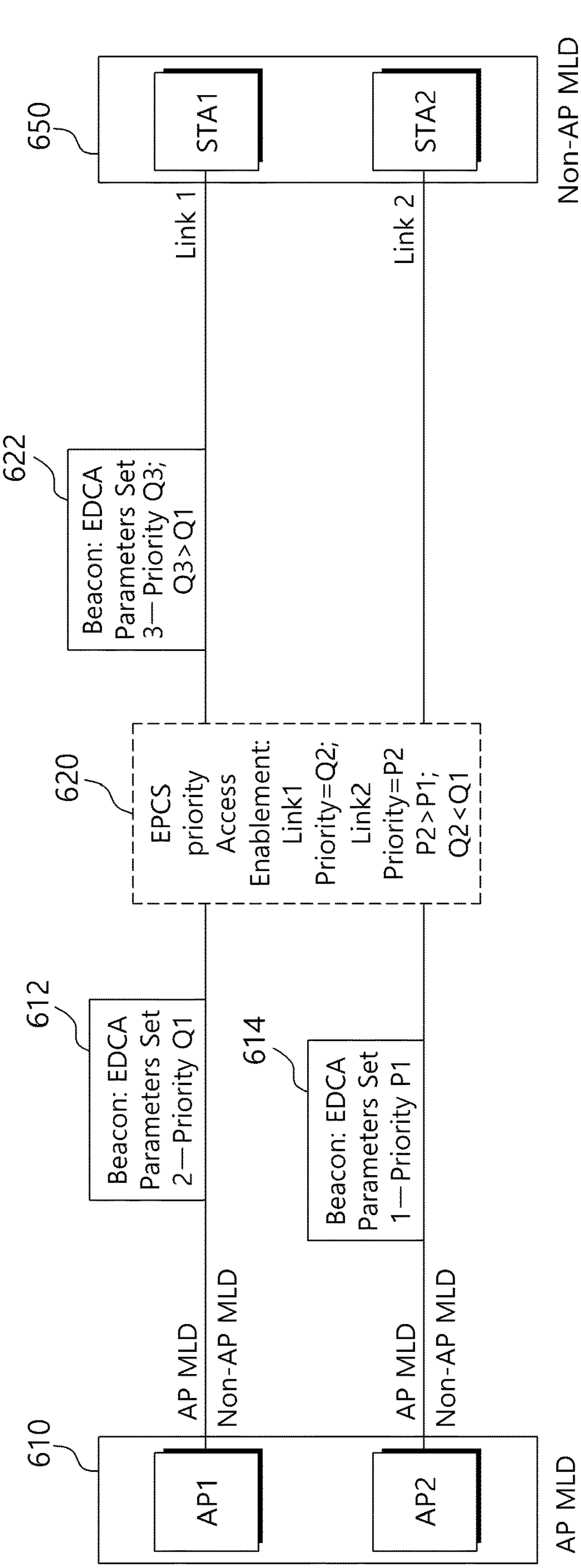
FIG. 6 shows an example of wireless communication in accordance with an embodiment.

FIG. 6 shows an example of wireless communication in accordance with an embodiment. This example may be applicable to IEEE 802.11be standard and any future amendments to IEEE 802.11 standard. The AP MLD 610 and the non-AP MLD 650 may be examples of the AP MLD 310 and the non-AP MLD 320 illustrated in FIG. 3, respectively. The AP MLD 610 may include two affiliated APs (AP 1 and AP 2), and the non-AP MLD 650 may include two affiliated STAs (STA 1 and STA 2). AP 1 and STA 1 may operate on Link 1 (a first link), and AP 2 and STA 2 may operate on Link 2 (a second link). As shown in the example of FIG. 6, in some embodiments, for the EPCS procedure for regular non-AP MLD (not NSTR Mobile AP MLD), if the EPCS priority access state is in the enabled state by at least one associated EPCS non-AP MLD, then if the EDCA parameters previously sent out by an AP affiliated with an EPCS AP MLD in Management frames do not result in higher priority for the STAs that are affiliated with EPCS non-AP MLDs in the enabled state, that AP may announce EDCA parameters in Management frames that result in higher priority for those STAs with EPCS priority access in the enabled state.

In the example of FIG. 6, AP 1 of the (non-NSTR) Mobile AP MLD 610 may broadcast a Beacon frame 612 on Link 1 carrying the EDCA Parameters Set 2, with access priority Q1. AP 2 of the (non-NSTR) Mobile AP MLD 610 may broadcast a Beacon frame 614 on Link 2 carrying the EDCA Parameters Set 1, with access priority P1.

In operation 620, in an EPCS Priority Access enablement process similar to the process described in FIG. 5, the priority for Link 2 may now be set to P2, with P2 having a priority higher (greater) than the previous priority P1 on Link 2. The EPCS Priority Access enablement process may also set the priority for Link 1 to Q2. However, the priority Q2 is lower (less) than the previously set priority Q1 on Link 1. Since an EPCS priority needs to be higher, in order to correct the priority, AP 1 may need to broadcast another Beacon frame for Link 1 with revised priority parameters. In this example, AP 1 may broadcast a Beacon frame 622 on Link 1, carrying the EDCA Parameters Set 3, with access priority Q3 higher (greater) than priority Q1.

In some embodiments, an NSTR Mobile AP MLD may enable EPCS priority access on the primary link of the NSTR Mobile AP MLD for an associated non-AP MLD. However, in a NSTR operation, Beacon and Probe Response frames may only be sent over the Primary link and may not be sent over non-primary link. For example, if the links in FIG. 6 are NSTR links (not shown) and Link 1 is non-primary, AP 1 may not be able to broadcast the Beacon frame 622 on Link 1. In these embodiments, a similar issue may also happen for the cases when EDCA parameters need to be updated after tearing down of the EPCS state.

Figure 7:
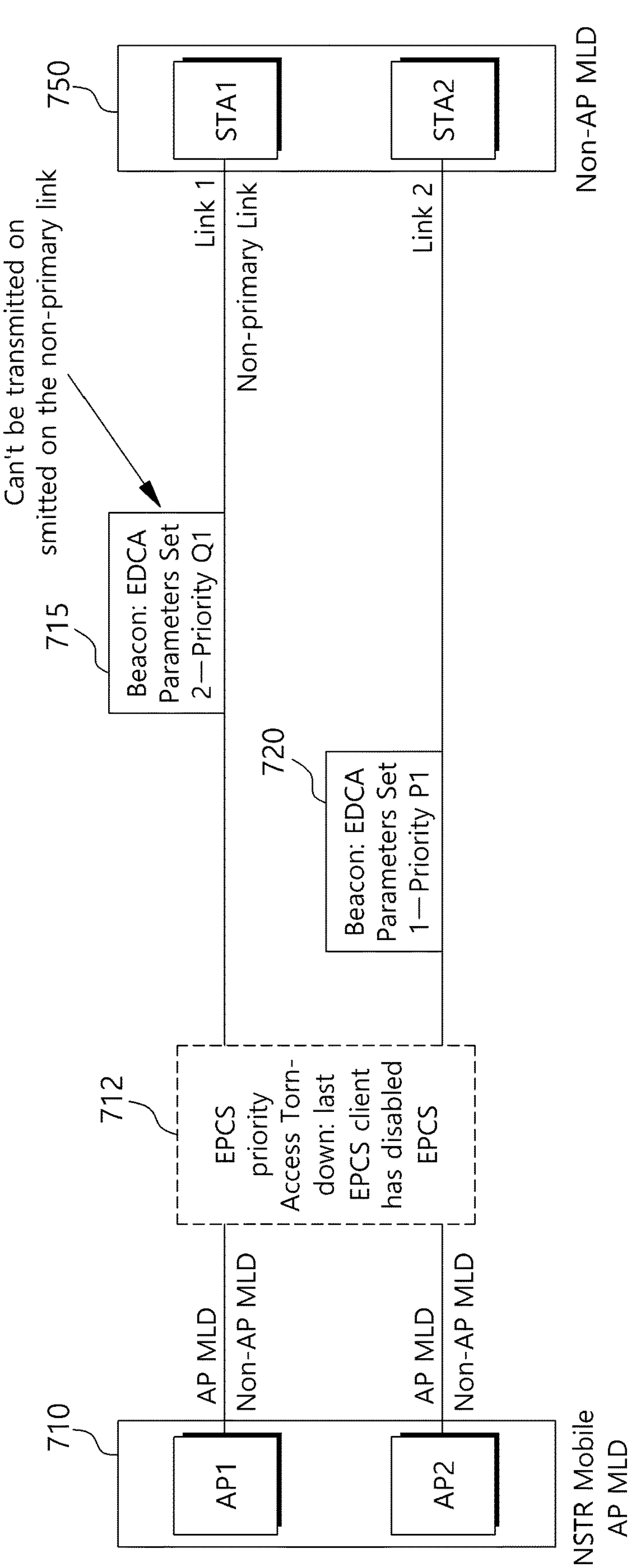
FIG. 7 shows an example of wireless communication with an example EPCS tear down process in accordance with an embodiment.

FIG. 7 shows an example of wireless communication in accordance with an embodiment. This example may be applicable to IEEE 802.11be standard and any future amendments to IEEE 802.11 standard. The AP MLD 710 and the non-AP MLD 750 may be examples of the AP MLD 310 and the non-AP MLD 320 illustrated in FIG. 3, respectively. The AP MLD 710 may include two affiliated APs (AP 1 and AP 2), and the non-AP MLD 750 may include two affiliated STAs (STA 1 and STA 2). AP 1 and STA 1 may operate on Link 1 (a non-primary link), and AP 2 and STA 2 may operate on Link 2 (a Primary link). FIG. 7 shows an example EPCS tear down process in a NSTR operation. In this example, Link 1 is non-primary link and Link 2 is Primary link between NSTR Mobile AP MLD 710 and Non-AP MLD 750. In some embodiments, an AP affiliated with an EPCS AP MLD with its EPCS priority access state set to the torn down state for all its associated STAs may announce the EDCA parameter set corresponding to the link in Management frames (e.g., Beacon or Probe Response) following the procedure of contention based channel access procedure. For example, in FIG. 7 NSTR operation, in operation 712, EPCS tear down may be processed and all EPCS clients disable EPCS. AP 2 of AP MLD 710 may broadcast Beacon frame 720 on Link 2, carrying the EDCA Parameters Set 1, with access priority P1. Referring back to FIG. 6, this is the access priority for Link 2 before EPCS enablement.

In some embodiments, Beacon frame may not be transmitted on the non-primary Link 1 of the NSTR Mobile AP MLD 710. For example, AP 1 of the NSTR Mobile MLD 710 may not send a Beacon frame 715 on non-primary Link 1. As a result, EDCA parameters may not be updated for the non-primary link.

In some embodiments, an NSTR Mobile AP MLD may enable EPCS priority access on the non-primary link of the NSTR Mobile AP MLD for an associated non-AP MLD.

In some embodiments, an NSTR Mobile AP MLD may enable EPCS priority access on both the Primary link and the non-primary link of the NSTR Mobile AP MLD for an associated non-AP MLD.

Figure 8:
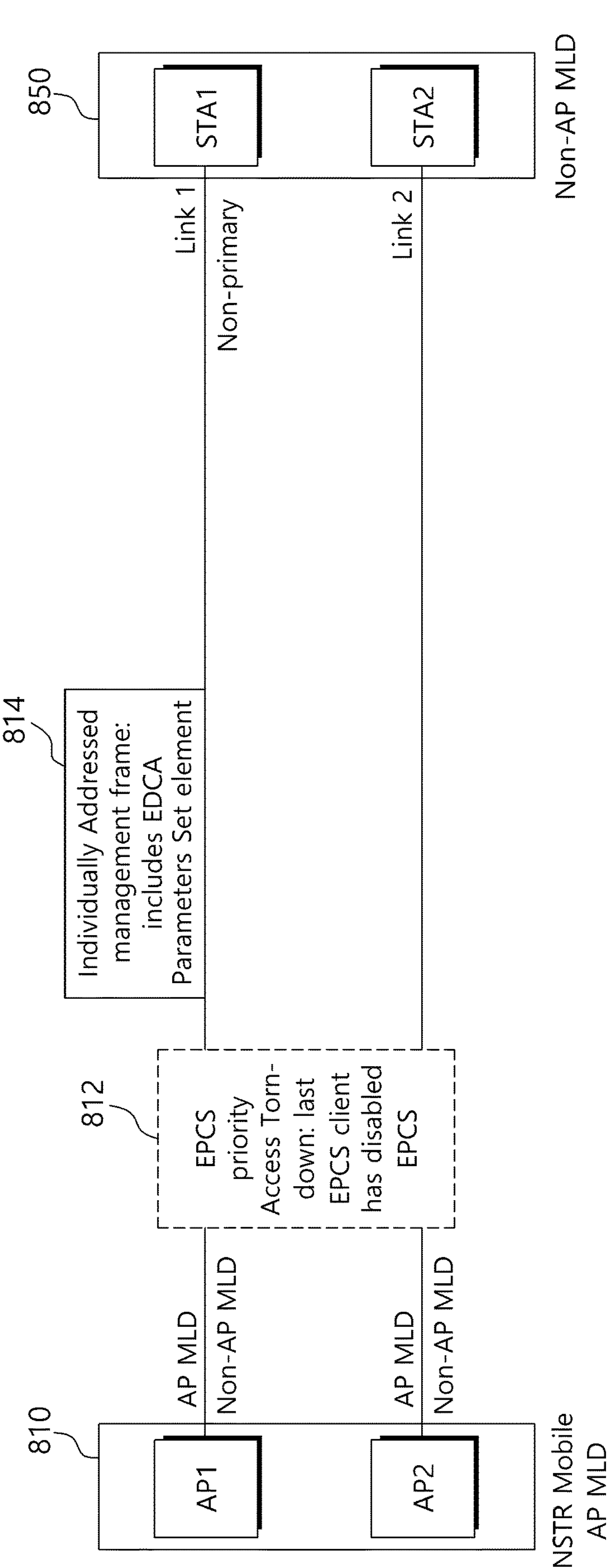
FIG. 8 shows an example of wireless communication in accordance with an embodiment.

FIG. 8 shows an example of wireless communication in accordance with an embodiment. This example may be applicable to IEEE 802.11be standard and any future amendments to IEEE 802.11 standard. The AP MLD 810 and the non-AP MLD 850 may be examples of the AP MLD 310 and the non-AP MLD 320 illustrated in FIG. 3, respectively. The AP MLD 810 may include two affiliated APs (AP 1 and AP 2), and the non-AP MLD 850 may include two affiliated STAs (STA 1 and STA 2). AP 1 and STA 1 may operate on Link 1 (a non-primary link), and AP 2 and STA 2 may operate on Link 2 (a second link). Although FIG. 8 shows an example of two APs and two STAs, there may less or more number of APs and STAs.

FIG. 8 shows an example for updating a non-primary link in an NSTR operation. In some embodiments, when an NSTR Mobile AP MLD enables EPCS priority access for any associated non-AP MLD, if the EDCA parameters for the non-AP MLD need to be updated for the non-primary link, the NSTR Mobile AP MLD may send individually addressed management frame to an associated non-AP MLD on the non-primary link to update the EDCA parameters. For example, the individually addressed management frame on the non-primary link of the NSTR Mobile AP MLD may include an EDCA Parameters Set element.

Referring back to the example of FIG. 7, group-addressed management frame (e.g., Beacon frame) may not be transmitted on the non-primary Link 1 of the NSTR mobile AP MLD 710. As a result, EDCA parameters may not be updated for the non-primary Link 1. However, in the example of FIG. 8, after the EPCS tear down process 812, the NSTR Mobile AP MLD 810 may send individually addressed management frame 814 to the associated non-AP MLD 850 on the non-primary Link 1 to update the EDCA parameters. The individually addressed management frame 814 may include an EDCA Parameters Set element with the updated access priority value.

In some embodiments, an NSTR Mobile AP MLD, regardless of whether it supports EPCS priority access or not, may update EDCA parameters on the non-primary link by sending the individually addressed management frame to an associated non-AP MLD. The NSTR Mobile AP MLD may include an EDCA Parameters Set element in the individually addressed management frame on the non-primary link.

Figure 9:
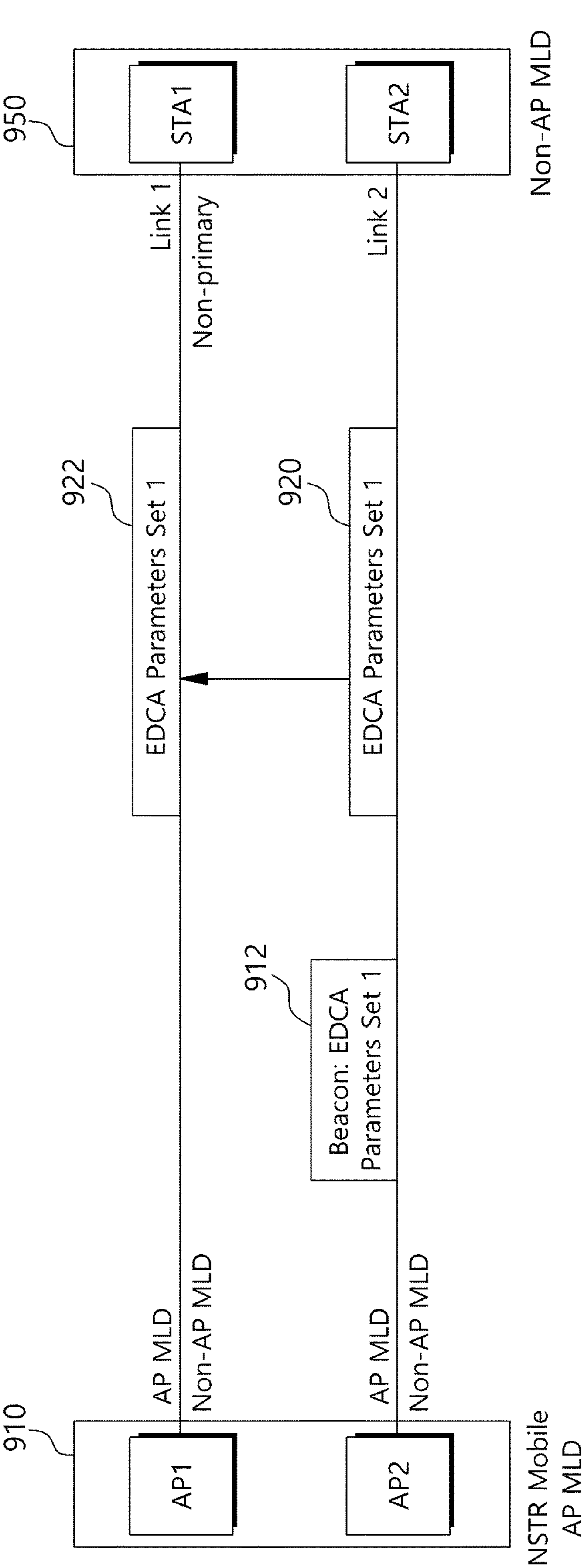
FIG. 9 shows an example of wireless communication in accordance with an embodiment.

FIG. 9 shows an example of wireless communication in accordance with an embodiment. This example may be applicable to IEEE 802.11be standard and any future amendments to IEEE 802.11 standard. The AP MLD 910 and the non-AP MLD 950 may be examples of the AP MLD 310 and the non-AP MLD 320 illustrated in FIG. 3, respectively. The AP MLD 910 may include two affiliated APs (AP 1 and AP 2), and the non-AP MLD 950 may include two affiliated STAs (STA 1 and STA 2). AP 1 and STA 1 may operate on Link 1 (a non-primary link), and AP 2 and STA 2 may operate on Link 2 (a Primary link). Although FIG. 9 shows an example of two APs and two STAs, there may less or more number of APs and STAs.

In the example of FIG. 9, the communication operation is an NSTR operation. In some embodiments, an NSTR Mobile AP MLD may set the EDCA parameters for the non-primary link to be the same as those of the primary link. For example, when an NSTR Mobile AP MLD enables EPCS priority access for any associated non-AP MLD 950, EDCA parameters in Parameters Set 922 for EPCS priority access for the non-primary Link 1 may be the same as the EDCA parameters in Parameters Set 920 for the primary Link 2 of the NSTR Mobile AP MLD 910.

In the example of FIG. 9, the NSTR Mobile AP MLD 910 sent a Beacon frame 912 on the Primary Link 2, carrying EDCA Parameters Set 1. In some embodiments, the EDCA parameters in Parameters Set 922 for EPCS priority access for the non-primary Link 1 may be the same as the Parameters Set 1 for the Primary Link 2. Further details are described below.

Figure 10:
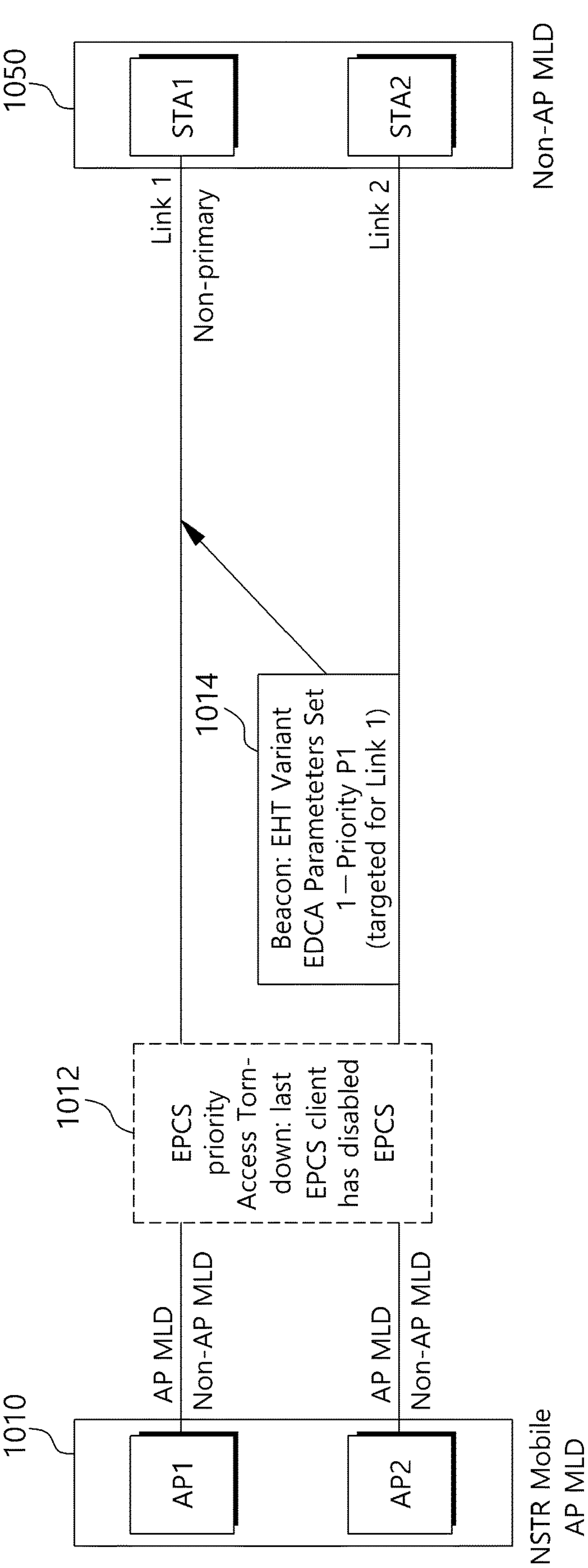
FIG. 10 shows an example of wireless communication in accordance with an embodiment.

FIG. 10 shows an example of wireless communication in accordance with an embodiment. This example may be applicable to IEEE 802.11be standard and any future amendments to IEEE 802.11 standard. The AP MLD 1010 and the non-AP MLD 1050 may be examples of the AP MLD 310 and the non-AP MLD 320 illustrated in FIG. 3, respectively. The AP MLD 1010 may include two affiliated APs (AP 1 and AP 2), and the non-AP MLD 1050 may include two affiliated STAs (STA 1 and STA 2). AP 1 and STA 1 may operate on Link 1 (a non-primary link), and AP 2 and STA 2 may operate on Link 2 (a Primary link). Although FIG. 10 shows an example of two APs and two STAs, there may less or more number of APs and STAs.

FIG. 10 shows an example of an NSTR operation with an Extreme High Throughput (EHT) variant EDCA Parameters Set element in Beacon frames. In some embodiments, an NSTR Mobile AP MLD may include an EHT variant EDCA Parameters Set element in the Beacon frame it transmits on the primary link. In the transmitted EHT variant EDCA Parameters Set element, the NSTR Mobile AP MLD may make an indication on whether the EDCA parameters included in the EHT variant EDCA Parameters Set element are for the primary link or for the non-primary link. For example, as shown in FIG. 10, after the EPCS tear down process 1012, the NSTR Mobile AP MLD 1010 may want to update the EDCA parameters on the non-primary Link 1. The NSTR Mobile AP MLD 1010 may send Beacon frame 1014 on Primary Link 2, carrying an EHT variant indicating that the EDCA Parameters Set 1 in the Beacon frame 1014 is actually targeted for the non-primary Link 1.

FIG. 11 shows an example of a format of the EHT variant EDCA Parameters Set element in accordance with an embodiment. This example may be applicable to IEEE 802.11be standard and any future amendments to IEEE 802.11 standard.

In some embodiments, a new subfield 1100 may be defined at the end of an EDCA Parameters Set element. The Element ID, Length, QoS Info, Update EDCA Info, To Link ID, AC_BE Parameter Record AC_BK Parameter Record, AC_VI Parameter Record, and AC_VO Parameter Record subfields may have the same definitions and interpretations as those of EDCA Parameters Set element. The Link Indication subfield 1100 may indicate whether the EDCA parameters included in the EHT variant EDCA Parameters Set element are for the Primary link or for the non-primary link.

In some embodiments, the Link Indication subfield 1100 of the EHT variant EDCA Parameters Set element may be or may include 1 bit. In these embodiments, a 7-bit Reserved subfield may be defined following the Link Indication subfield 1100. For example, if the Link Indication subfield

1100 of the EHT variant EDCA Parameters Set element is set to 1, it may indicate that the included EDCA parameters are for the Primary link, otherwise, the included EDCA parameters are for the non-primary link. The opposite definition may also be possible.

In some embodiments, the Link Indication subfield 1100 may be a two-bit subfield (not shown). In these embodiments, an example encoding of the subfield may be as follows:

Value 0: The EDCA parameters are for the non-primary link.

Value 1: The EDCA parameters are for the Primary link.

Value 2: The EDCA parameters are for both the Primary link and the non-primary link.

Value 3: Reserved.

The encoding of the subfield described above is an example, other encoding values may also be possible.

In these embodiments when the Link Indication subfield 1100 may be a two-bit subfield, a 6-bit Reserved subfield may be defined following the Link Indication subfield 1100.

Figure 12:
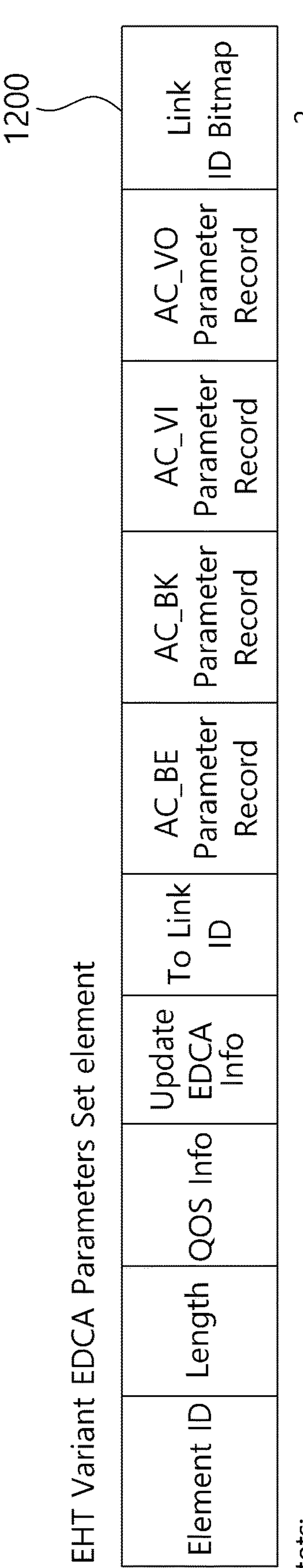
FIG. 12 shows an example of another format of the EHT variant EDCA Parameters Set element in accordance with an embodiment.

FIG. 12 shows another example of a format of the EHT variant EDCA Parameters Set element in accordance with an embodiment. This example may be applicable to IEEE 802.11be standard and any future amendments to IEEE 802.11 standard.

In some embodiments, the Link Indication subfield may be or may include a Link ID Bitmap. For example, the Link ID Bitmap subfield 1200 may indicate the link to which the EDCA parameters included in the EHT variant EDCA Parameters Set element applies. For example, if the bit position i in the Link ID Bitmap subfield 1200 is set to 1, it may indicate that the EDCA parameters included in the EHT variant EDCA Parameters Set element applies to Link i; otherwise, the EDCA parameters included in the EHT variant EDCA Parameters Set element does not apply to Link i. The opposite definition may also be possible. The definitions and interpretations of the subfields Element ID, Length, QoS Info, Update EDCA Info, To Link ID, AC_BE Parameter Record AC_BK Parameter Record, AC_VI Parameter Record, and AC_VO Parameter Record may be same as that of EDCA Parameters Set element.

In some embodiments, the Link ID Bitmap subfield 1200 may be or may include two octets. Other lengths may also be possible.

Figure 13A:
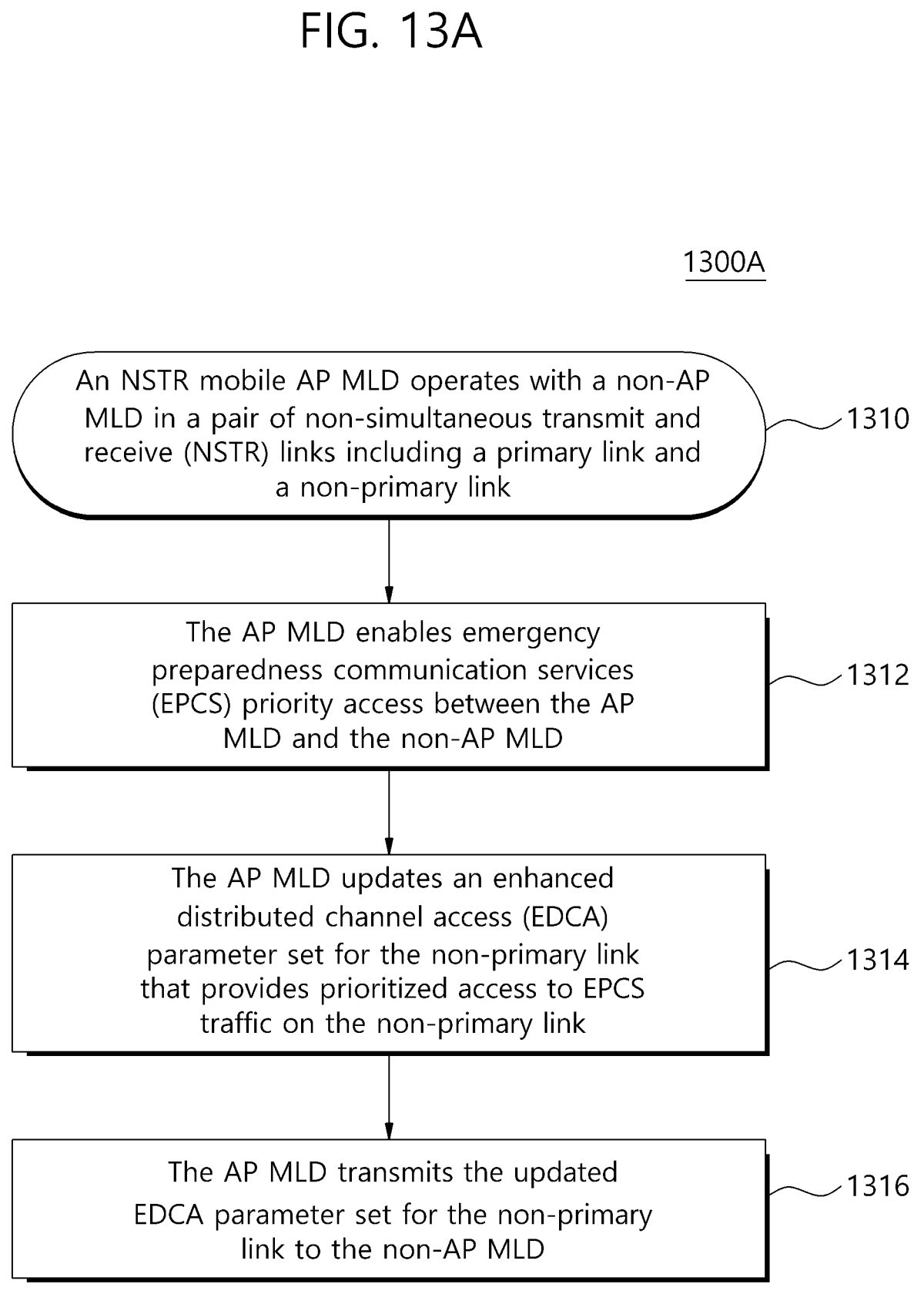

FIG. 13A shows an example of a wireless communication process 1300A in accordance with an embodiment. In operation 1310, an NSTR Mobile AP MLD operates with a non-AP MLD in a pair of NSTR links including a primary link and a non-primary link. In operation 1312, The AP MLD may enable EPCS priority access between the AP MLD and the non-AP MLD. In operation 1314, in some embodiments, the AP MLD may update an EDCA parameter set for the non-primary link that provides prioritized access to EPCS traffic on the non-primary link. In operation 1316, in some embodiments, the AP MLD may transmit the updated EDCA parameter set for the non-primary link to the non-AP MLD.

FIG. 13B shows an example of a wireless communication process 1300B for using the EHT variant EDCA Parameters Set element in accordance with an embodiment. In operation 1322, an NSTR Mobile AP MLD that supports EPCS priority access may enable EPCS priority access for one or more of its associated non-AP MLD.

In operation 1324, the NSTR Mobile AP MLD may determine if its EDCA parameters need to be updated for any of its links. If it is determined that the EDCA parameters do not need to be updated for any of the links, the process 1300B may proceed to operation 1326. In operation 1306, the NSTR Mobile AP MLD may continue the EPCS priority access operation with the current EDCA parameters for the corresponding link(s).

In some embodiments, if it is determined (in operation 1324) that the EDCA parameters need to be updated for any of the links, the process 1300B may proceed to operation 1328. In operation 1328, the NSTR Mobile AP MLD may construct an EHT variant EDCA Parameters Set element with the appropriate EDCA parameters and indicate the link(s) for which the EDCA parameters apply. The EHT variant EDCA Parameters Set element may be constructed in accordance with one of the formats described above.

In some embodiments, the process 1300B may proceed to operation 1330. In operation 1330, the NSTR Mobile AP MLD may include the constructed EHT variant EDCA Parameters Set element in one or more Beacon frames. The NSTR Mobile AP MLD may then transmit the one or more Beacon frames on a Primary link. The operation 1330 represents the operation described in FIG. 10.

FIG. 13C shows another example of a wireless communication process 1300C in accordance with an embodiment. In operation 1340, an NSTR Mobile AP MLD that supports EPCS priority access may enable EPCS priority access for one or more of its associated non-AP MLD.

In operation 1342, the NSTR Mobile AP MLD may determine if its EDCA parameters need to be updated for any of its non-primary link(s). If it is determined that the EDCA parameters do not need to be updated for any of the non-primary link(s), the process 1300C may proceed to operation 1344. In operation 1344, the NSTR Mobile AP MLD may continue the EPCS priority access operation with the current EDCA parameters for the corresponding link(s).

In some embodiments, if it is determined (in operation 1342) that the EDCA parameters need to be updated for any of the non-primary link(s), the process 1300C may proceed to operation 1346. In operation 1346, the NSTR Mobile AP MLD may construct an EDCA Parameters Set element with the appropriate EDCA parameters for the non-primary link (s) that need to be updated.

In operation 1348, the NSTR Mobile AP MLD may include the constructed EDCA Parameters Set element in an individually addressed management frame. In operation 1350, the NSTR Mobile AP MLD may transmit the individually addressed management frame to an associated non-AP MLD on a non-primary link.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term "include," "have," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An access point (AP) multi-link device (MLD) associated with a non-AP MLD in a wireless network, the AP MLD comprising:

at least two APs affiliated with the AP MLD; and a processor coupled to the at least two APs, the processor configured to:

operate with the non-AP MLD in a pair of non-simultaneous transmit and receive (NSTR) links including a primary link and a non-primary link, wherein the primary link is established between a first AP affiliated with the AP MLD and a first station (STA) affiliated with the non-AP MLD and the non-primary link is established between a second AP affiliated with the AP MLD and a second STA affiliated with the non-AP MLD;

enable emergency preparedness communication services (EPCS) priority access between the AP MLD and the non-AP MLD;

update an enhanced distributed channel access (EDCA) parameter set for the non-primary link that provides prioritized access to EPCS traffic on the non-primary link; and transmit a beacon frame including the updated EDCA parameter set for the non-primary link via the primary link to the non-AP MLD;

wherein the updated EDCA parameter set includes information indicating that the updated EDCA parameter set is for the non-primary link.

2. The AP MLD of claim 1, wherein the processor is further configured to:

update an EDCA parameter set for the primary link that provides prioritized access to EPCS traffic on the primary link; and transmit the updated EDCA parameter set for the primary link via the primary link to the first STA affiliated with the non-AP MLD, wherein the updated EDCA parameter set for the non-primary link is the same as the updated EDCA parameter set for the primary link.

3. The AP MLD of claim 1, wherein the processor is further configured to:

update an EDCA parameter set for the primary link that provides prioritized access to EPCS traffic on the primary link; and transmit the updated EDCA parameter set for the primary link in a beacon frame via the primary link to the first STA affiliated with the non-AP MLD.

4. A non-access point (non-AP) multi-link device (MLD) associated with an AP MLD in a wireless network, the non-AP MLD comprising:

at least two stations (STAs) affiliated with the non-AP MLD; and a processor coupled to the at least two STAs, the processor configured to:

operate with the AP MLD in a pair of non-simultaneous transmit and receive (NSTR) links including a primary link and a non-primary link, wherein the primary link is established between a first AP affiliated with the AP MLD and a first STA affiliated with the non-AP MLD and the non-primary link is established between a second AP affiliated with the AP MLD and a second STA affiliated with the non-AP MLD;

request emergency preparedness communication services (EPCS) priority access between the non-AP MLD and the AP MLD; and receive a beacon frame that includes an updated EDCA parameter set for the non-primary link via the primary link from the AP MLD, wherein the updated EDCA parameter set includes information indicating that the updated EDCA parameter set is for the non-primary link.

5. The non-AP MLD of claim 4, wherein the processor is further configured to:

receive an updated EDCA parameter set for the primary link via the primary link at the first STA affiliated with the non-AP MLD that provides prioritized access to EPCS traffic on the primary link, wherein the updated EDCA parameter set for the primary link is the same as the updated EDCA parameter set for the non-primary link.

6. The non-AP MLD of claim 4, wherein the processor is further configured to:

receive an EDCA parameter set for the primary link that provides prioritized access to EPCS traffic on the primary link at the first STA affiliated with the non-AP MLD that provides prioritized access to EPCS traffic on the primary link.

7. A method of enabling emergency preparedness communication services (EPCS) priority access by an access point (AP) multi-link device (MLD) associated with a non-AP MLD in a wireless network, the method comprising:

operating with the non-AP MLD in a pair of non-simultaneous transmit and receive (NSTR) links including a primary link and a non-primary link, wherein the primary link is established between a first AP affiliated with the AP MLD and a first station (STA) affiliated with the non-AP MLD and the non-primary link is established between a second AP affiliated with the AP MLD and a second STA affiliated with the non-AP MLD;

enabling emergency preparedness communication services (EPCS) priority access between the AP MLD and the non-AP MLD;

updating an enhanced distributed channel access (EDCA) parameter set for the non-primary link that provides prioritized access to EPCS traffic on the non-primary link, and transmitting a beacon frame including the updated EDCA parameter set for the non-primary link via the primary link to the non-AP MLD, wherein the updated EDCA parameter set includes information indicating that the updated EDCA parameter set is for the non-primary link.

8. The method of claim 7 further comprising:

updating an EDCA parameter set for the primary link that provides prioritized access to EPCS traffic on the primary link, and transmitting the updated EDCA parameter set for the primary link via the primary link to the first STA affiliated with the non-AP MLD, wherein the updated EDCA parameter set for the non-primary link is same as the updated EDCA parameter set for the primary link.

9. The method of claim 7, further comprising:

updating an EDCA parameter set for the primary link that provides prioritized access to EPCS traffic on the primary link; and transmitting the updated EDCA parameter set for the primary link in a beacon frame via the primary link to the first STA affiliated with the non-AP MLD.

* * * * *